(12) United States Patent
Wietfeldt

(10) Patent No.: US 9,844,065 B2
(45) Date of Patent: Dec. 12, 2017

(54) OPTIMIZING THE REACH OF A MESSAGE BEACON DEVICE

(71) Applicant: QUALCOMM Incorporated, San Diego, CA (US)

(72) Inventor: Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 14/755,827

(22) Filed: Jun. 30, 2015

(65) Prior Publication Data

US 2017/0006615 A1    Jan. 5, 2017

(51) Int. Cl.
| | |
|---|---|
| *H04W 52/00* | (2009.01) |
| *H04W 72/08* | (2009.01) |
| *H04W 8/00* | (2009.01) |
| *H04W 40/24* | (2009.01) |
| *H04W 48/16* | (2009.01) |
| *H04W 88/06* | (2009.01) |
| *H04W 88/10* | (2009.01) |
| *H04W 88/18* | (2009.01) |
| *H04W 72/04* | (2009.01) |

(52) U.S. Cl.
CPC ......... *H04W 72/085* (2013.01); *H04W 8/005* (2013.01); *H04W 40/244* (2013.01); *H04W 48/16* (2013.01); *H04W 72/046* (2013.01); *H04W 88/06* (2013.01); *H04W 88/10* (2013.01); *H04W 88/184* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 8,938,237 B2 | 1/2015 | Zappulla | |
| 2006/0089099 A1* | 4/2006 | Buchwald | H04W 74/00 455/41.2 |

(Continued)

FOREIGN PATENT DOCUMENTS

WO    2013126859 A2    8/2013

OTHER PUBLICATIONS

Andreev S., et al., "Intelligent Access Network Selection in Converged Multi-Radio Heterogeneous Networks," W.I.N.T.E.R. Group, Dec. 2014, 17 pages.

(Continued)

*Primary Examiner* — Brandon Renner
(74) *Attorney, Agent, or Firm* — MG-IP Law, P.C.

(57) ABSTRACT

Systems and methods are disclosed for optimizing the reach of a message beacon device. The method may include identifying a plurality of transceivers associated with the message beacon device, analyzing each identified transceiver on the basis of a resource consumption associated with the identified transceiver, an interference of the identified transceiver with a different transceiver of the plurality of identified transceivers, a reach of the identified transceiver, or a combination thereof, selecting a transmission set from the plurality of identified transceivers based on the analysis of each identified transceiver, and transmitting a message beacon using each selected transceiver in the transmission set.

30 Claims, 9 Drawing Sheets

(56) References Cited

U.S. PATENT DOCUMENTS

| | | | |
|---|---|---|---|
| 2007/0223434 A1* | 9/2007 | Bennett | H04W 52/04 370/338 |
| 2008/0261535 A1* | 10/2008 | Weil | H04B 17/17 455/67.11 |
| 2011/0280188 A1* | 11/2011 | Jeon | H04B 7/0413 370/328 |
| 2012/0231808 A1* | 9/2012 | Moeglein | G01S 5/0236 455/456.1 |
| 2013/0022022 A1 | 1/2013 | Schmitt | |
| 2013/0148642 A1 | 6/2013 | Abraham et al. | |
| 2013/0225216 A1 | 8/2013 | Calin et al. | |
| 2013/0245387 A1* | 9/2013 | Patel | A61B 5/0002 600/300 |
| 2014/0056220 A1 | 2/2014 | Poitau et al. | |
| 2014/0146704 A1* | 5/2014 | Cho | H04L 45/46 370/254 |
| 2015/0131536 A1* | 5/2015 | Kaur | H04L 5/001 370/329 |
| 2015/0215853 A1* | 7/2015 | Ling | H04W 64/003 370/254 |
| 2015/0230009 A1* | 8/2015 | Choi | H04Q 11/02 370/278 |

OTHER PUBLICATIONS

Arkko J., et al., "Network Discovery and Selection Problem," Network Working Group, Request for Comments: 5113, Jan. 2008, pp. 1-39.
International Search Report and Written Opinion—PCT/US2016/034121—ISA/EPO—Aug. 26, 2016.

* cited by examiner

OPTIMIZING THE REACH OF A MESSAGE BEACON DEVICE

INTRODUCTION

Aspects of this disclosure relate generally to message beacon devices, and more particularly to systems and methods for optimizing the reach of a message beacon device.

Message beacons are increasingly used to wirelessly share information with proximate wireless devices. The message beacons are sometimes transmitted by message beacon devices, which may be part of a pre-existing infrastructure, or may be devices that are specifically designed to transmit message beacons. The message beacon devices have various applications, including advertising to devices that are proximate to the specific area from which the message beacons are transmitted, location based tracking services (particularly indoors), etc.

Message beacon devices may be equipped with several different transceivers. The transceivers may operate in accordance with different wireless protocols and/or application protocols (i.e., vendor- or manufacturer-specific protocols). Because different wireless devices also operate in accordance with different wireless protocols and/or application protocols, it can be advantageous to increase the number of transceivers in the message beacon device. By ensuring that the message beacon device and the proximate wireless devices share at least one common wireless protocol, the reach of the message beacon device can be maximized. The reach of the message beacon device may be simply defined as the number of proximate wireless devices that receives message beacons from the message beacon device.

One way to maximize reach is to transmit as many message beacons as possible using every transceiver with which the message beacon device is equipped. However, this approach fails to account for other factors. For example, depending on the level of resources available to the message beacon device (for example, the type of power supply, rate of consumption, etc.), maximizing reach may not be the optimal approach. Likewise, certain operations of one transceiver in a multi-transceiver message beacon device can interfere with the operations of another transceiver in the multi-transceiver message beacon device. If resources are scarce and the impact of interference is high, then maximizing reach without regard may not be the best approach. Accordingly, new solutions are needed to optimize the reach of message beacon devices. Ideally, these solutions account for the costs and benefits of reaching additional wireless devices.

SUMMARY

In one aspect, the present disclosure provides a method for optimizing the reach of a message beacon device. The method may comprise, for example, identifying a plurality of transceivers associated with the message beacon device, analyzing each identified transceiver on the basis of a resource consumption associated with the identified transceiver, an interference of the identified transceiver with a different transceiver of the plurality of identified transceivers, a reach of the identified transceiver, or a combination thereof, selecting a transmission set from the plurality of identified transceivers based on the analysis of each identified transceiver, and transmitting a message beacon using each selected transceiver in the transmission set.

In another aspect, the present disclosure provides a message beacon device with optimized reach. The message beacon device may comprise, for example, a plurality of transceivers associated with the message beacon device, a transceiver analyzer configured to identify each of the plurality of transceivers and analyze each identified transceiver on the basis of a resource consumption associated with the identified transceiver, an interference of the identified transceiver with a different transceiver of the plurality of identified transceivers, a reach of the identified transceiver, or a combination thereof, a transmission set selector configured to select a transmission set from the plurality of identified transceivers based on the analysis of each identified transceiver, and a message beacon selector configured to provide a message beacon to each selected transceiver in the selected transmission set.

In yet another aspect, the present disclosure provides an apparatus for optimizing the reach of a message beacon device. The apparatus may comprise, for example, means for identifying a plurality of transceivers associated with the message beacon device, means for analyzing each identified transceiver on the basis of a resource consumption associated with the identified transceiver, an interference of the identified transceiver with a different transceiver of the plurality of identified transceivers, a reach of the identified transceiver, or a combination thereof, means for selecting a transmission set from the plurality of identified transceivers based on the analysis of each identified transceiver, and means for transmitting a message beacon using each selected transceiver in the transmission set.

In yet another aspect, the present disclosure provides a non-transitory computer-readable medium comprising code, which, when executed by a processor, causes the processor to perform operations for optimizing the reach of a message beacon device. The non-transitory computer-readable medium may comprise, for example, code for identifying a plurality of transceivers associated with the message beacon device, code for analyzing each identified transceiver on the basis of a resource consumption associated with the identified transceiver, an interference of the identified transceiver with a different transceiver of the plurality of identified transceivers, a reach of the identified transceiver, or a combination thereof, code for selecting a transmission set from the plurality of identified transceivers based on the analysis of each identified transceiver, and code for transmitting a message beacon using each selected transceiver in the transmission set.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
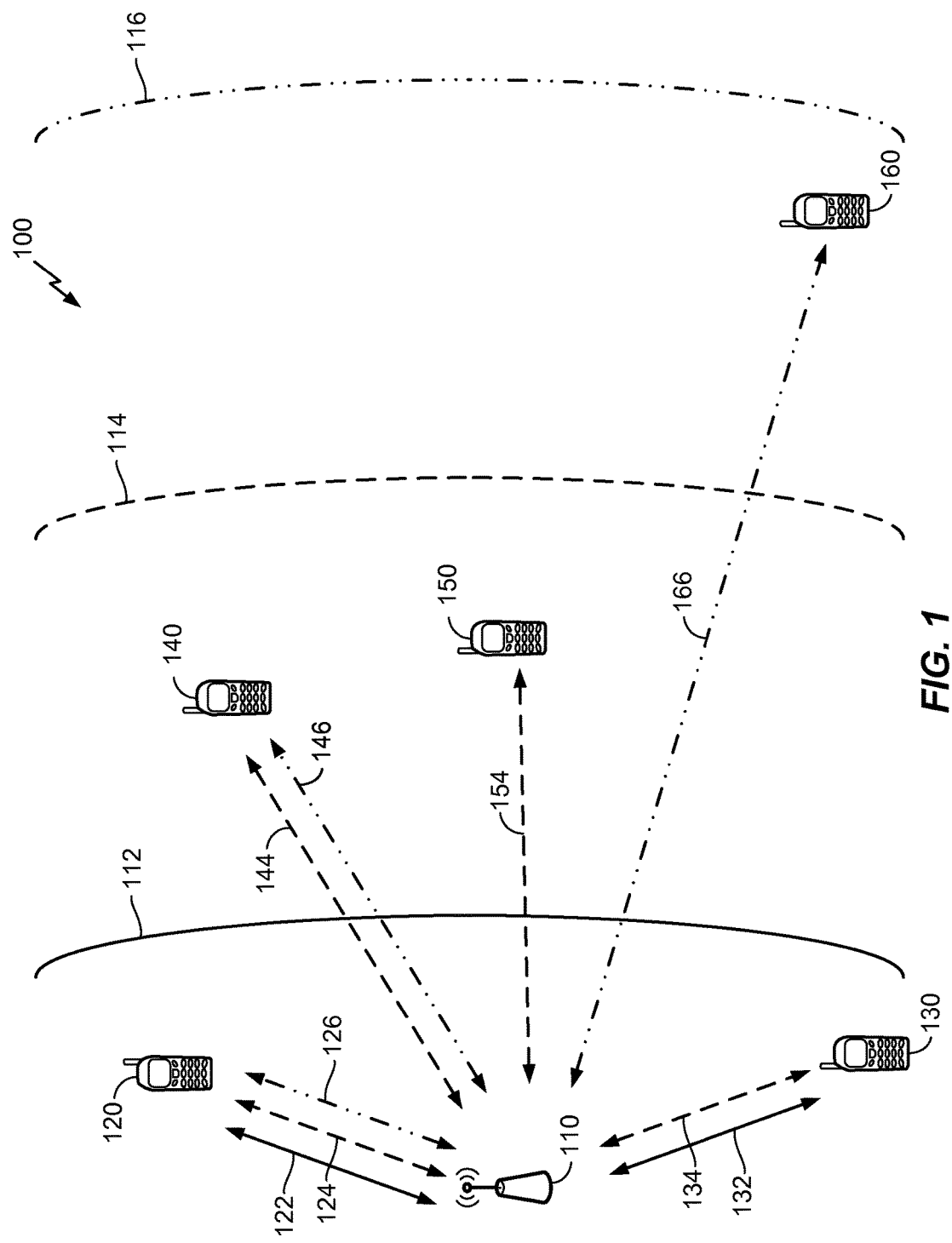
FIG. 1 generally illustrates a wireless communications environment in accordance with an aspect of the disclosure.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention. The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation. Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a wireless device, may be mobile or stationary, and may communicate with a radio access network (RAN). As used herein, the term "wireless device" may be referred to interchangeably as an "access terminal" or "AT", a "wireless device", a "subscriber device", a "subscriber terminal", a "subscriber station", a "user equipment" or UE, a "user terminal" or UT, a "mobile terminal", a "mobile station" and variations thereof. Generally, wireless devices can communicate with a core network via the RAN, and through the core network the wireless devices can be connected with external networks such as the Internet. Of course, other mechanisms of connecting to the core network and/or the Internet are also possible for the wireless devices, such as over wired access networks, Wi-Fi networks (e.g., based on IEEE 802.11, etc.) and so on. Wireless devices can be embodied by any of a number of types of devices including but not limited to PC cards, compact flash devices, external or internal modems, wireless or wireline phones or tablets, and so on. A communication link through which wireless devices can send signals to the RAN is called an uplink channel (e.g., a reverse traffic channel, a reverse control channel, an access channel, etc.). A communication link through which the RAN can send signals to wireless devices is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a wireless communications environment 100 in accordance with an aspect of the disclosure. The wireless communications environment 100 includes a message beacon device 110 and a plurality of wireless devices 120, 130, 140, 150, 160.

The message beacon device 110 includes a plurality of transceivers, which will be explained in further detail in the description of FIG. 2. In the example illustration of FIGS. 1-2, the message beacon device 110 includes three different transceivers, each associated with a different radio access technology (RAT). However, it will be understood that aspects of the disclosure can be implemented in a message beacon device 110 having any number of transceivers associated with any number of RATs.

In FIG. 1, each of the three transceivers has a different range. The first transceiver has a first range 112 (shown as a solid line), the second transceiver has a second range 114 (shown as a dashed line), and the third transceiver has a third range 116 (shown as a dashed and dotted line). The respective ranges of each transceiver may be a function of any number of factors, including, for example, the RAT associated with the transceiver, the power associated with the transmissions of the transceiver, the topography of the wireless communications environment 100, etc. In one possible implementation, the first transceiver having first range 112 is a Bluetooth transceiver, the second transceiver having second range 114 is a WiFi transceiver, and the third transceiver having third range 116 is a LTE transceiver. In this possible implementation, the first range 112 may be on the order of approximately ten meters, the second range 114 may be on the order of approximately thirty meters, and the third range 116 may be on the order of approximately five hundred meters. Although each of the three transceivers in FIG. 1 is depicted as having a different range, it will be understood that different transceivers can have equal range.

The message beacon device 110 is configured to utilize point-to-point links ("P2P" links) with wireless devices. The P2P links can be utilized using known techniques. The message beacon device 110 can establish a P2P link using the first transceiver, second transceiver, and/or the third transceiver. In order for the message beacon device 110 to utilize a P2P link with a given wireless device, the given wireless device must be equipped with at least one transceiver that corresponds to one of the transceivers in the message beacon device 110, and must also be within the range associated with that transceiver. As used herein, the term P2P broadly encompasses point-to-multipoint (P2MP) technology as well. In a strict unicast mode, links are established between two individual points, whereas in a multicast/broadcast mode, a single transmission may reach a plurality of receivers. Moreover, the term "link" merely implies the possibility of wireless communication in at least one direction and need not imply selection, discovery, or any other protocol.

Typically, a particular transceiver will transmit using one transmission mode at a given time (unicast, multicast, or broadcast, as noted above). However, the transmission mode may change based on requirements or other factors. Moreover, each particular transceiver in a given message beacon device may transmit in a different transmission mode. For example, a first transceiver may transmit in a unicast mode while a second transceiver transmits in a multicast mode. Such selection and operation may be implemented in software functionality. Operations amongst beacons and devices such as smartphones may be compatible or incompatible amongst different manufacturers, vendors, high level operating systems (HLOS) in the beacon or smartphone device, or based on other factors.

Message beacons consist of one or more packets, often but not based on the Internet Protocol (IP). Non-IP protocols may consist of air interface specific protocols such as, for example, Bluetooth or LTE-Direct. Each message beacon includes a source address and a destination address, and there may be multiple destination addresses possible (one at a time), corresponding to unicast, multicast, and broadcast transmissions.

A unicast destination address is uniquely associated with a single device, for example, an IP address. A broadcast destination address is a special or unique address, different than all possible single-device addresses, which may be recognized by a plurality of devices. A single device may respond to both its unique unicast addresses as well as one or more broadcast addresses. For example, different services may be associated with specific broadcast addresses (i.e., a specific broadcast address may be associated with coffee-related advertisements while another is associated with fashion-related advertisements). A multicast address is similar to a broadcast address in the sense that it is a unique address, but targets a generally smaller set of devices compared to a broadcast transmission.

Transmission control protocol ("TCP") messages are an example of unicast P2P messages that are directed to a single device with a unique destination address. Generally, a transmitter of TCP messages receives explicit acknowledgement messages (ACKs) from the destination device. By contrast, user datagram protocol ("UDP") messages (sometimes referred to as 'send and forget' messages) do not requires ACKs. Generally, multicast P2MP messages are not acknowledged by the receiving devices (no ACKs), but they may be acknowledged in certain scenarios. In such cases, acknowledgements may be handled at a protocol layer higher than the transmission layers, such as in a software layer or in device hardware. ACKs may also be handled in a standardized fashion such as TCP/IP or in a variety of proprietary fashions. The ability to ACK a beacon transmitter therefore may be present in both unicast and broadcast/multicast modes of operation. The choice of transmission, unicast or multicast, and mode of acknowledgement (or no acknowledgement) may be standardized or manufacturer/vendor specific.

Specific vendors or manufacturers may use proprietary mechanisms to define multicast addresses, such that the vendor- or manufacturer-specific devices are made sensitive to specific beacon broadcasts. These systems may therefore not be interoperable. Defining such multicast addresses simplifies the ability of beacon transmitters to reach multiple devices in a single P2MP multicast, including in certain scenarios where users opt-in to certain services. However, unicast operation to individual devices may be preferred in some circumstances, such as including the ability to send targeted messages to specific devices. This may include special ads, special deals on promotional savings, etc. The unicast method may be difficult when large numbers of devices are within range of the message beacon device, but the number may be truncated by, for example, restricting to unicasts within the vicinity of a cell tower or access point, by using device geolocation data, or through other means.

In accordance with one aspect of the disclosure, the message beacon device 110 is configured to optimize the reach of the message beacon device 110. For example, the message beacon device 110 may provide public information such as, for example, advertisements, public service information, etc. The simplest way for a message beacon device 110 to maximize reach is to transmit message beacons at the highest possible rate on every transceiver at the highest possible transmission power. However, in some scenarios, practical constraints may arise due to resource consumption at the message beacon device 110. Moreover, transmissions using one transceiver can sometimes cause interference with transmissions on another transceiver, a phenomenon known as self-interference. In some implementations, resources can be conserved, and reach optimized, by improving the coexistence of the various transceivers (i.e., by limiting self-interference or cross-device interference). In accordance with one aspect of the disclosure, the message beacon device 110 is configured to optimize the reach of the message beacon device 110 by increasing the transmission interval of the message beacons on one or more transceivers, decreasing the transmission power on one or more transceivers, or simply shutting down one or more transceivers.

FIG. 1 depicts a plurality of wireless devices 120, 130, 140, 150, 160, each of which is within one or more of the ranges 112, 114, 116 and equipped with one or more corresponding transceivers. Although each of the wireless devices 120, 130, 140, 150, 160 is depicted as a cell phone, it will be understood that the wireless devices 120, 130, 140, 150, 160 may be any device that is capable of wireless communication with the message beacon device 110.

The wireless device 120 depicted in FIG. 1 is equipped with three different transceivers corresponding to the three different transceivers included in the message beacon device 110. In addition, the wireless device 120 is also within reach of the respective ranges 112, 114, 116 associated with the three different transceivers included in the message beacon device 110. As a result, a P2P link can be established between the message beacon device 110 and the wireless device 120 using any of the three different transceivers included in the message beacon device 110. As noted above, the term "P2P" broadly encompasses both P2P and P2MP technology. Moreover, the term "link" merely implies the possibility of wireless communication in at least one direction and need not imply selection, discovery, or any other protocol. FIG. 1 shows a first P2P link 122 (shown as a solid line) between the message beacon device 110 and wireless device 120, as well as a second P2P link 124 (shown as a dashed line) and a third P2P link 126 (shown as a dashed and dotted line).

Like the wireless device 120, the wireless device 130 is within each of the respective ranges 112, 114, 116 associated with the three different transceivers included in the message beacon device 110. However, unlike the wireless device 120, the wireless device 130 is equipped with only two transceivers. As a result, a P2P link can be established between the message beacon device 110 and the wireless device 120 using only the two transceivers with which the wireless device 120 is equipped. Accordingly, FIG. 1 shows a first P2P link 132 (shown as a solid line) between the message beacon device 110 and wireless device 130 as well as a second P2P link 134 (shown as a dashed line). It will be understood that even though the wireless device 130 is within the third range 116 of the third transceiver included in the message beacon device 110, no P2P link can be utilized using the third transceiver because the wireless device 130 is not equipped with a corresponding transceiver.

The wireless device 140 depicted in FIG. 1 is within the second range 114 and the third range 116 associated with the second and third transceivers of the message beacon device 110, respectively. However, the wireless device 140 is not within the first range 112 associated with the first transceiver. As a result, the message beacon device 110 cannot utilize a P2P link between the message beacon device 110 and the wireless device 140 using the first transceiver, regardless of whether the wireless device 140 is in fact equipped with a corresponding transceiver. However, in FIG. 1, the wireless device 140 is equipped with a transceiver that corresponds to the second transceiver and a transceiver that corresponds to the third transceiver. Accordingly, FIG. 1 does not show a first P2P link analogous to first P2P links 122, 132, but does show a second P2P link 144 (shown as a dashed line) between the message beacon device 110 and wireless device 140 as well as a third P2P link 146 (shown as a dashed and dotted line).

Like the wireless device 140, the wireless device 150 is within the second range 114 and third range 116 associated with the second and third transceivers of the message beacon device 110, respectively. However, unlike the wireless device 140, the wireless device 150 is not equipped with a transceiver corresponding to the third transceiver included in the message beacon device 110. As a result, the message beacon device 110 can only use the second transceiver to utilize a second P2P link 154 (shown as a dashed line) with the wireless device 150. The message beacon device 110 cannot utilize a first P2P link using the first transceiver because the wireless device 150 is not within the first range 112. Moreover, the message beacon device 110 cannot utilize a third P2P link using the third transceiver because the wireless device 150 is not equipped with a corresponding transceiver.

The wireless device 160 is not within the first range 112 or the second range 114 associated with the first and second transceivers of the message beacon device 110, respectively. However, the wireless device 160 is within the third range 116 and is equipped with a transceiver corresponding to the third transceiver included in the message beacon device 110. As a result, the message beacon device 110 can utilize a third P2P link 166 (shown as a dashed and dotted line) between the message beacon device 110 and the wireless device 160.

Because the wireless devices 120, 130, 140, 150, 160 are differently located and equipped, the message beacon device 110 can analyze the costs and benefits of using each particular transceiver and optimize the reach of the message beacon device 110. For example, as noted above, the wireless device 160 cannot be reached unless the third transceiver is utilized. However, the third transceiver may be associated with high rates of resource consumption. For example, each message beacon may require high transmission power in order to pervade the entirety of the third range 116. If the message beacon device 110 is associated with a strong and/or constant power supply, then extending the reach to cover the wireless device 160 may justify transmissions using the third transceiver. On the other hand, if the message beacon device 110 is associated with a weak and/or depleting power supply, then transmissions using the third transceiver may not be justified.

In another example, suppose that multiple analogous wireless devices (not shown) are clustered with wireless device 160 (i.e., similarly located and equipped). In this case, the message beacon device 110 may determine that transmissions using the third transceiver are justified, even if the message beacon device 110 is associated with a weak and/or depleting power supply. The reach of the message beacon device 110 may be optimized by using the third transceiver (despite the high resource consumption associated with transmission) because the transmission reaches a cluster of wireless devices, rather than just one (i.e., wireless device 160).

In yet another example, suppose that the message beacon device 110 is associated with a strong and/or constant power supply, such that transmissions using the third transceiver are justified. However, the message beacon device 110 determines that transmissions using the third transceiver interfere with transmissions using the second transceiver. As a result, the message beacon device 110 may determine not to operate using the third transceiver, even though the message beacon device 110 is not prevented from transmitting by resource consumption restraints. Instead, the message beacon device 110 may determine not to operate using the third transceiver because the utilization of the third P2P link 166 interferes with the utilization of second P2P links 124, 134, 144, 154. In this example, transmission of a message beacon to the wireless device 160 will ensure that the wireless device 150 will not be reached, and jeopardize the transmission of message beacons to wireless devices 120, 130, 140. Accordingly, the reach of the message beacon device 110 may be optimized by declining to transmit using the third transceiver, even though an additional wireless device 160 is reachable, and resource consumption is not a constraint.

Other possibilities can be understood from FIG. 1. For example, suppose that wireless devices 120, 130 are the only wireless devices in the wireless communications environment 100. As noted above, both wireless devices 120, 130 can be reached using either the first transceiver or the second transceiver. If the message beacon device 110 determines that the second transceiver is associated with greater resource consumption than the first transceiver, then the message beacon device 110 may transmit message beacons using only the first transceiver. In the absence of other wireless devices, the message beacon device 110 can reduce resource consumption without sacrificing reach.

However, suppose that wireless devices 140, 150 are also included in the wireless communications environment 100. As noted above, wireless devices 140, 150 cannot be reached using the first transceiver. Accordingly, the message beacon device 110 sacrifices reach if it transmits message beacons using only the first transceiver (as in the previous scenario). Even if the second transceiver consumes more resources, the message beacon device 110 may determine that additional resource consumption is justified because additional wireless devices 140, 150 can be reached using second P2P links 144, 154. Moreover, the message beacon device 110 may also determine that the second transceiver can also reach the wireless devices 120, 130. Accordingly, the message beacon device 110 may decline to transmit using the first transceiver, because doing so will not reach additional wireless devices that are not already reached by the second transceiver.

It will be understood that FIG. 1 depicts five wireless devices that are equipped and located in a specific manner for the purpose of illustration. It will be understood that the wireless communications environment 100 may include any number of wireless devices, each being located and equipped in any manner. The message beacon device 110 is configured to optimize reach by determining the costs and benefits of using the respective transceivers in a given manner. The costs may include resource consumption and the benefits may include reach. Self-interference can increase the resource consumption and/or reduce the reach of the message beacon device 110. Accordingly, the message beacon device 110 may analyze resource availability, interference among transceivers, and the individual reach of each transceiver when optimizing the overall reach of the message beacon device 110.

Figure 2:
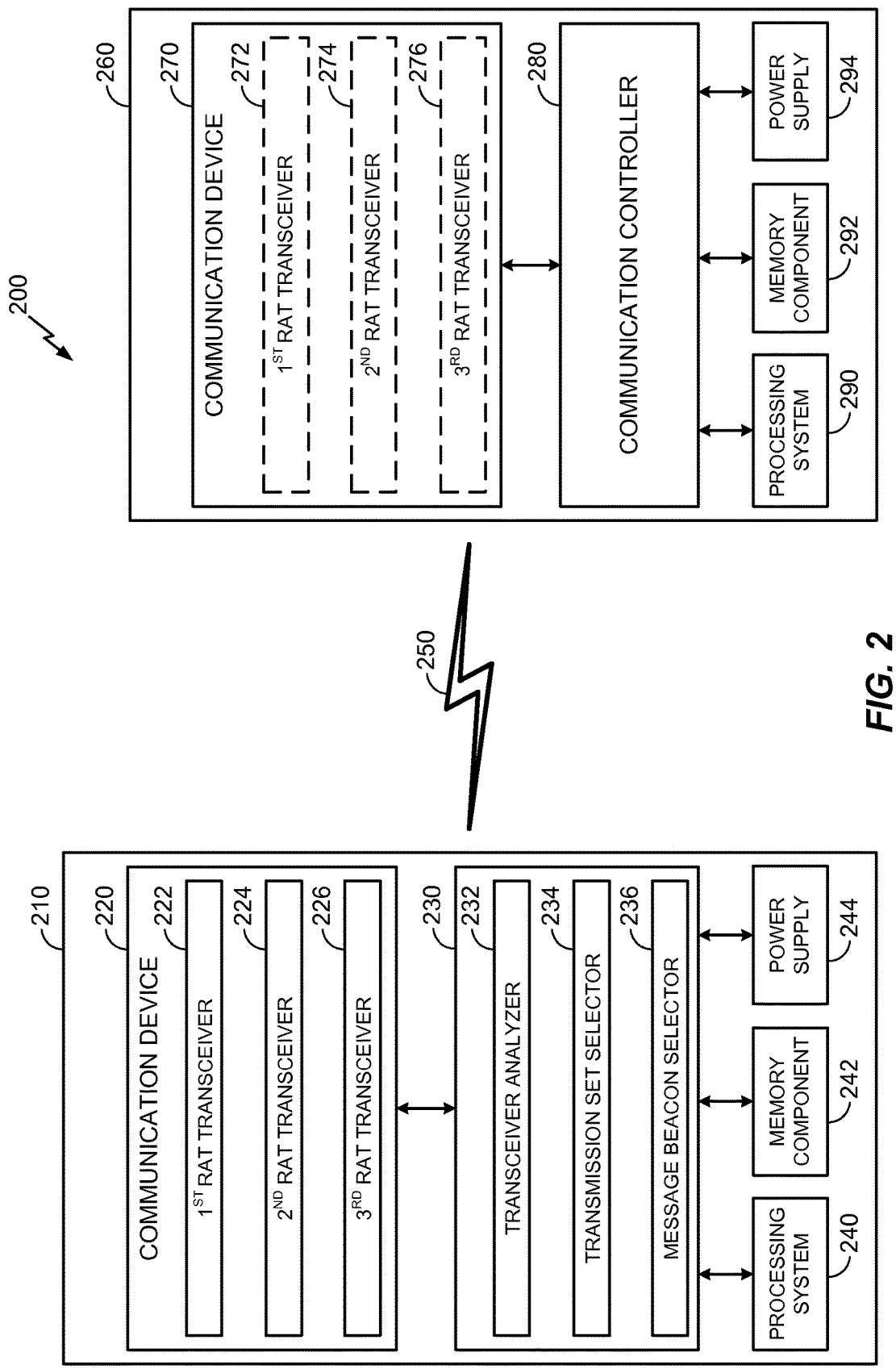
FIG. 2 generally illustrates a message beacon device and a wireless device interacting in the wireless communications environment of FIG. 1.

FIG. 2 illustrates a message beacon system 200 in accordance with an aspect of the disclosure. The message beacon system 200 includes a message beacon device 210 and a wireless device 260. The message beacon device 210 may be analogous to, for example, the message beacon device 110 of FIG. 1. The wireless device 260 may be analogous to, for example, any of the wireless devices 120, 130, 140, 150, 160 of FIG. 1.

In the example of FIG. 2, the message beacon device 210 and the wireless device 260 each generally include a wireless communication device (represented by the communication devices 220 and 270) for communicating with other network nodes via at least one designated RAT. The communication devices 220 and 270 may be variously configured for transmitting and encoding signals (e.g., messages, indications, information, and so on), and, conversely, for receiving and decoding signals (e.g., messages, indications, information, pilots, and so on) in accordance with the designated RAT. The message beacon device 210 and the wireless device 260 may also each generally include a communication controller (represented by the communication controllers 230 and 280) for controlling operation of their respective communication devices 220 and 270 (e.g., directing, modifying, enabling, disabling, etc.). The communication controllers 230 and 280 may operate at the direction of, or otherwise in conjunction with respective host system functionality (illustrated as the processing systems 240 and 290, the memory components 242 and 292, and the power supplies 244 and 294). In some designs, the communication controllers 230 and 280 may be partly or wholly subsumed by the respective host system functionality.

Turning to the illustrated communication in more detail, the wireless device 260 may transmit and receive messages via a wireless link 250 with the message beacon device 210, the message including information related to various types of communication (e.g., voice, data, multimedia services, associated control signaling, etc.). The wireless link 250 may operate over a communication medium of interest, composed of one or more frequency, time, and/or space communication resources (e.g., encompassing one or more channels across one or more carriers) associated with communication between one or more transmitter/receiver pairs, such as the message beacon device 210 and the wireless device 260.

As a particular example, the communication medium may correspond to at least a portion of an unlicensed frequency band shared with other RATs. In general, the message beacon device 210 and the wireless device 260 may operate via the wireless link 250 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, for example, IEEE 802.11 WLAN technologies generally referred to as "WiFi."

In the example of FIG. 2, the communication device 220 of the message beacon device 210 includes three co-located transceivers operating according to respective RATs, including a first transceiver 222, a second transceiver 224, and a third transceiver 226. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a WiFi chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., message). The transceivers 222, 224, 226 may differ from one another in terms of radio access technology (RAT), proprietary mechanism (vendor, manufacturer, etc.), or any other characteristic. Although only three transceivers are shown, it will be understood that the communication device 220 may be equipped with any number of transceivers.

The first transceiver 222, the second transceiver 224, and the third transceiver 226 may provide different functionalities and may be used for different purposes. As an example, the first transceiver 222 may operate in accordance with Bluetooth technology to provide communication with the wireless device 260 on the wireless link 250, the second transceiver 224 may operate in accordance with WiFi technology to provide communication with the wireless device 260 on the wireless link 250, and the third transceiver 226 may operate in accordance with Long Term Evolution (LTE) technology to provide communication with the wireless device 260 on the wireless link 250. Additionally or alternatively, one or more of the transceivers 222, 224, 226 may utilize manufacturer- or vendor-specific protocols (for example, proprietary application protocols). The communication device 270 of the wireless device 260 may optionally include one or more corresponding transceivers. For example, the communication device 270 may include a first transceiver 272 operating in accordance with Bluetooth technology on the wireless link 250, a second transceiver 274 operating in accordance with WiFi technology on the wireless link 250, and/or a third transceiver 276 operating in accordance with Long Term Evolution (LTE) technology to provide communication on the wireless link 250. Additionally or alternatively, one or more of the transceivers 222, 274, 276 may utilize manufacturer- or vendor-specific protocols (for example, proprietary application protocols).

The communication controller 230 of the message beacon device 210 may include a transceiver analyzer 232, a transmission set selector 234, and message beacon selector 236, which may operate in conjunction with the first transceiver 222, the second transceiver 224, and/or the third transceiver 226 to manage operation on the wireless link 250.

The transceiver analyzer 232 analyzes each transceiver associated with the message beacon device 210, for example, the first transceiver 222, the second transceiver 224, and/or the third transceiver 226. As will be described below by way of example, the analysis performed by the transceiver analyzer 232 may be based on resource consumption associated with each transceiver, the interference associated with operations of each transceiver, and/or the reach of each transceiver.

The transmission set selector 234 selects the first transceiver 222, the second transceiver 224, and/or the third transceiver 226 for transmitting message beacons. The transmission set selector 234 may also select transmission characteristics of each selected transceiver. As will be described below by way of example, the transmission set selector 234 may select, or not select, a particular transceiver for transmission of message beacons on the basis of the analysis performed by the transceiver analyzer 232.

The message beacon selector 236 provides a message beacon to each transceiver in the transmission set selected by the transmission set selector 234. In particular, the message beacon selector 236 will determine which transceiver, or set of transceivers, has been selected and provide to each selected transceiver an appropriate message beacon (for example, a properly formatted or encoded message beacon). In some implementations, the same message beacon is provided to every transceiver. In some implementations, the message beacons are tailored to the wireless protocol and/or application protocol used to transmit the message beacon, or the wireless device that is likely to receive the message beacons as a result of transmissions using the selected transceiver.

Figure 3:
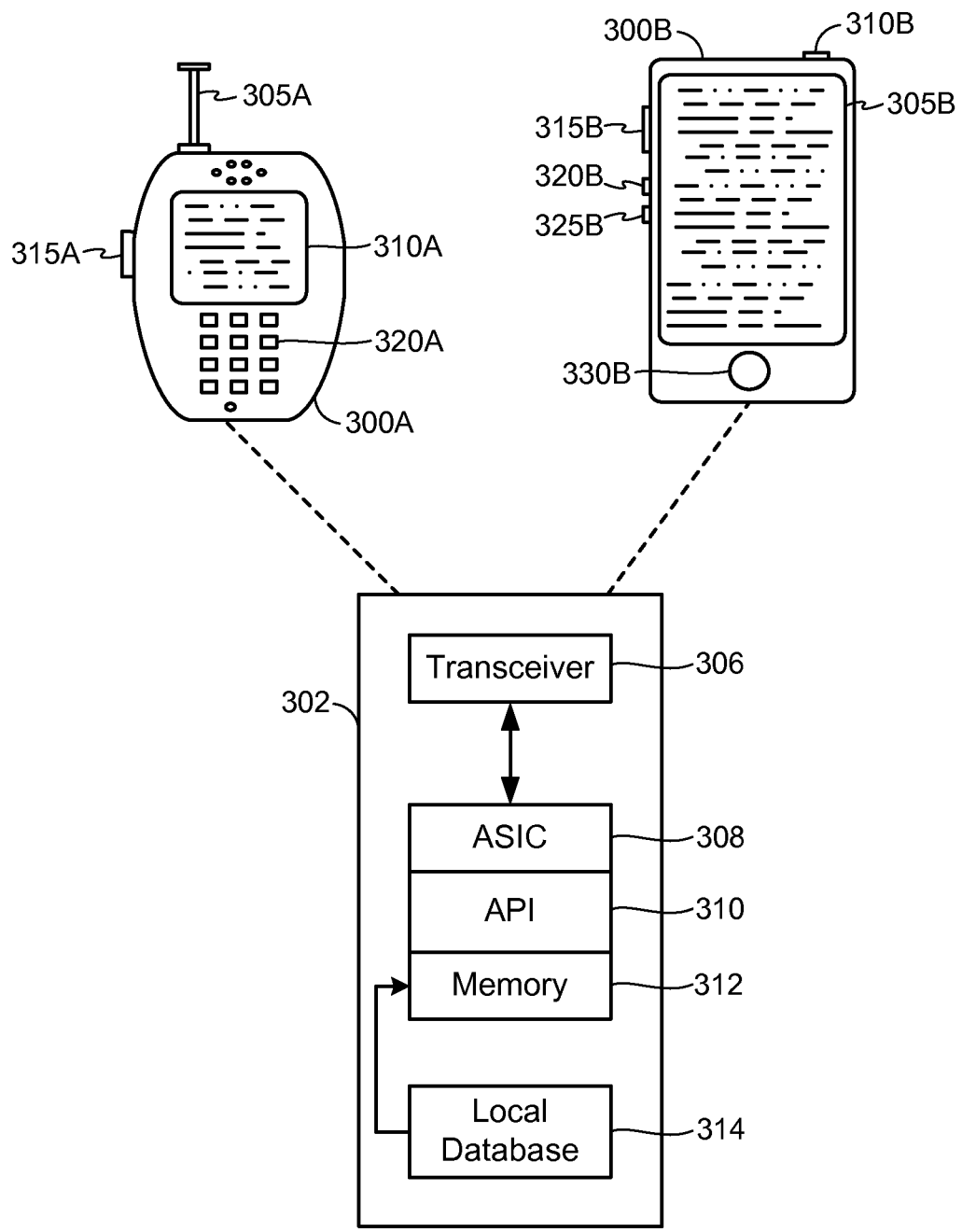
FIG. 3 generally illustrates examples of wireless devices in accordance with an aspect of the disclosure.

FIG. 3 illustrates examples of wireless devices in accordance with various aspects of the disclosure. Referring to FIG. 3, wireless device 300A is illustrated as a calling telephone and wireless device 300B is illustrated as a touchscreen device (e.g., a smart phone, a tablet computer, etc.). As shown in FIG. 3, an external casing of wireless device 300A is configured with an antenna 305A, display 310A, at least one button 315A (e.g., a PTT button, a power button, a volume control button, etc.) and a keypad 320A among other components, as is known in the art. Also, an external casing of wireless device 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. Each of wireless device 300A and wireless device 300B includes one or more user interface components through which a user of the wireless device 300A or wireless device 300B interacts with the device, for example, button 315A, touchscreen display 305B, etc. The user of the wireless device 300A or wireless device 300B can provide input or instructions to the device via one or more of the user interface components, and the device can provide output or notifications to the user via one or more of the user interface components. While not shown explicitly as part of wireless device 300B, the wireless device 300B can include one or more external antennas and/or one or more integrated antennas that are built into the external casing of wireless device 300B, including but not limited to Wi-Fi antennas, cellular antennas, satellite position system (SPS) antennas (e.g., global positioning system (GPS) antennas), and so on.

While internal components of wireless devices such as the wireless devices 300A and 300B can be embodied with different hardware configurations, a basic high-level wireless device configuration for internal hardware components is shown as platform 302 in FIG. 3. The platform 302 can receive and execute software applications, data and/or commands transmitted from a radio access network, internet, and/or remote servers and networks. The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a wireless device (e.g., wireless device 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the wireless devices 300A and 300B in FIG. 3 are to be considered merely illustrative and the invention is not limited to the illustrated features or arrangement.

The wireless communication between the wireless devices 300A and/or 300B and other devices can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the wireless devices from the radio access network using a variety of networks and configurations. Accordingly, the illustrations provided herein are not intended to limit the embodiments of the invention and are merely to aid in the description of aspects of embodiments of the invention.

Figure 4:
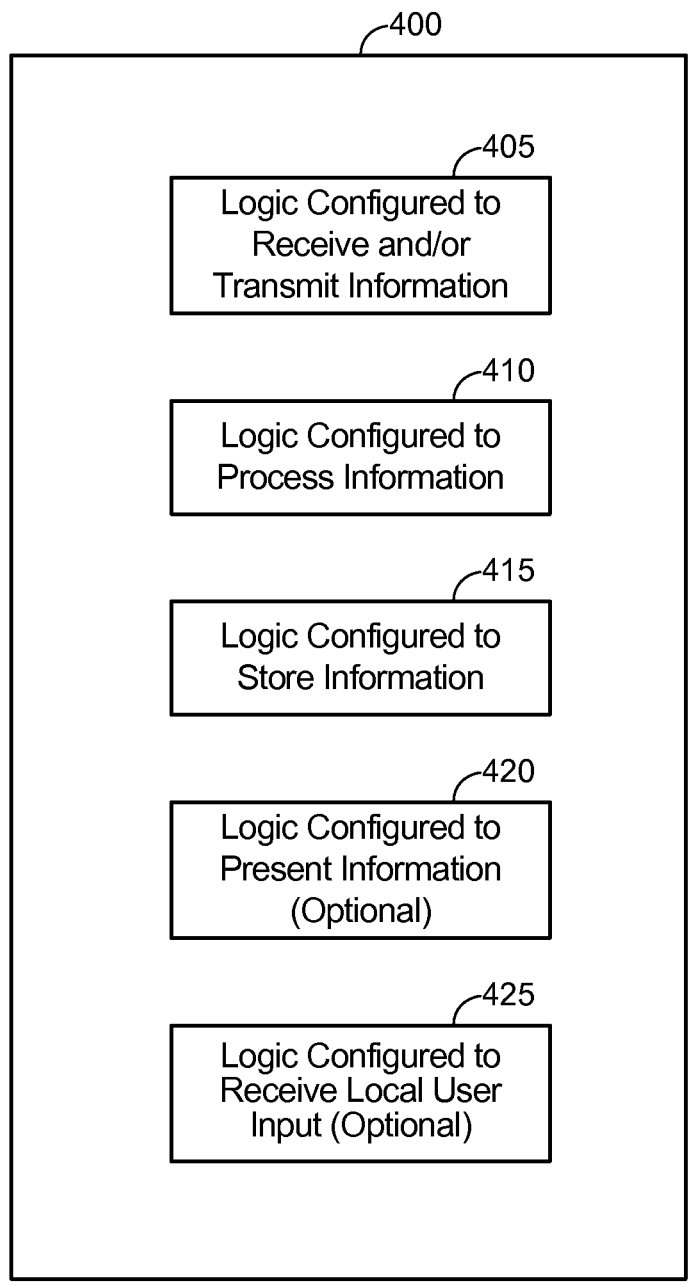
FIG. 4 generally illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to message beacon device 110, wireless devices 120, 130, 140, 150, 160, message beacon device 210, wireless device 260, wireless devices 300A or 300B, and so on.

Referring to FIG. 4, the communication device 400 includes logic configured to receive and/or transmit information 405. In an example, if the communication device 400 corresponds to a wireless communications device, the logic configured to receive and/or transmit information 405 can include a wireless communications interface (e.g., Bluetooth, Wi-Fi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet can be accessed, etc.). Thus, if the communication device 400 corresponds to some type of network-based server (e.g., PDSN, SGSN, GGSN, S-GW, P-GW, MME, HSS, PCRF, the application, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a sound sensor (microphone), a light sensor, an infrared sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to wireless device 300A or wireless device 300B as shown in FIG. 3, the logic configured to present information 420 can include the display 310A of wireless device 300A or the touchscreen display 305B of wireless device 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to wireless device 300A or wireless device 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
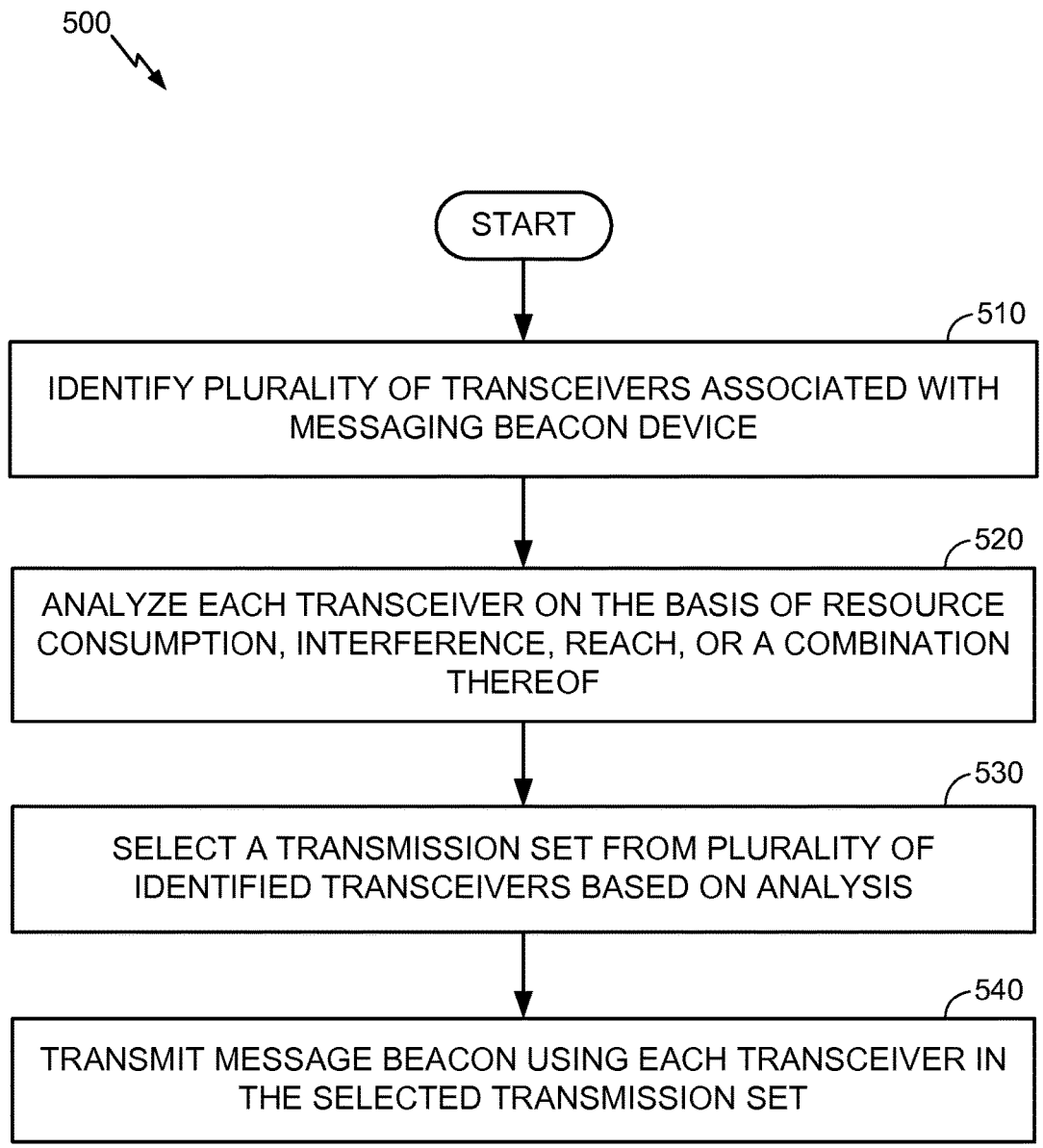
FIG. 5 generally illustrates a flow diagram for optimizing the reach of a message beacon device in accordance with an aspect of the disclosure.

FIG. 5 generally illustrates a method 500 for optimizing the reach of a messaging beacon device in accordance with an aspect of the disclosure. The method 500 may be performed by, for example, the message beacon device 110 of FIG. 1 or the message beacon device 210 of FIG. 2. For the purposes of illustration, the method 500 will be described in further detail as it would be performed by the message beacon device 210 of FIG. 2.

At 510, the message beacon device 210 identifies a plurality of transceivers associated with the message beacon device 210. The plurality of transceivers may include, for example, the first transceiver 222, second transceiver 224, and third transceiver 226 included in the communication device 220 of the message beacon device 210. In this example, the message beacon device 210 would identify each of the three transceivers. However, as noted above, the message beacon device 210 may be equipped with any number of transceivers operating in accordance with any number of RATs, each of which would be identified at 510 in accordance with the method 500.

At 520, the message beacon device 210 analyzes each of the transceivers identified at 510. The analysis at 520 may include, for example, analysis on the basis of resource consumption associated with the identified transceiver. Additionally or alternatively, the analysis at 520 may include, for example, analysis on the basis of interference associated with the identified transceiver. The interference may be, for example, self-interference with another of the identified transceivers. Additionally or alternatively, the analysis at 520 may include, for example, analysis on the basis of reach associated with the identified transceiver.

At 530, the message beacon device 210 selects a transmission set from the plurality of transceivers identified at 510 based on the analysis performed at 520. The selection at 530 may be directed toward optimizing the reach of the message beacon device 210. For example, the message beacon device 210 may include a given transceiver in the transmission set because the message beacon device 210 determines that the benefit of transmitting on the given transceiver exceeds the cost of transmitting on the given transceiver. The benefit may be related to a quantity of additional wireless devices that are reached through transmission on the given transceiver or characteristics thereof (as determined through the analysis performed at 520), and the cost may be related to the resource consumption associated with transmission on the given transceiver (as determined through the analysis performed at 520). An amount of interference with another transceiver (as determined through the analysis performed at 520) may effect either the cost or the benefit of transmitting on the given transceiver. Similarly, the message beacon device 210 may exclude a given transceiver from the transmission set because the message beacon device 210 determines that the benefit of transmitting on the given transceiver does not exceed the cost of transmitting on the given transceiver.

At 540, the message beacon device 210 transmits a message beacon using each transceiver in the selected transmission set. As noted above, the plurality of transceivers may include the first transceiver 222, second transceiver 224, and third transceiver 226. Any or all of these transceivers may be included in or excluded from the transmission set that is selected at 530. By including or excluding specific transceivers from the transmission set, the reach of the message beacon 210 can be optimized.

Figure 6:
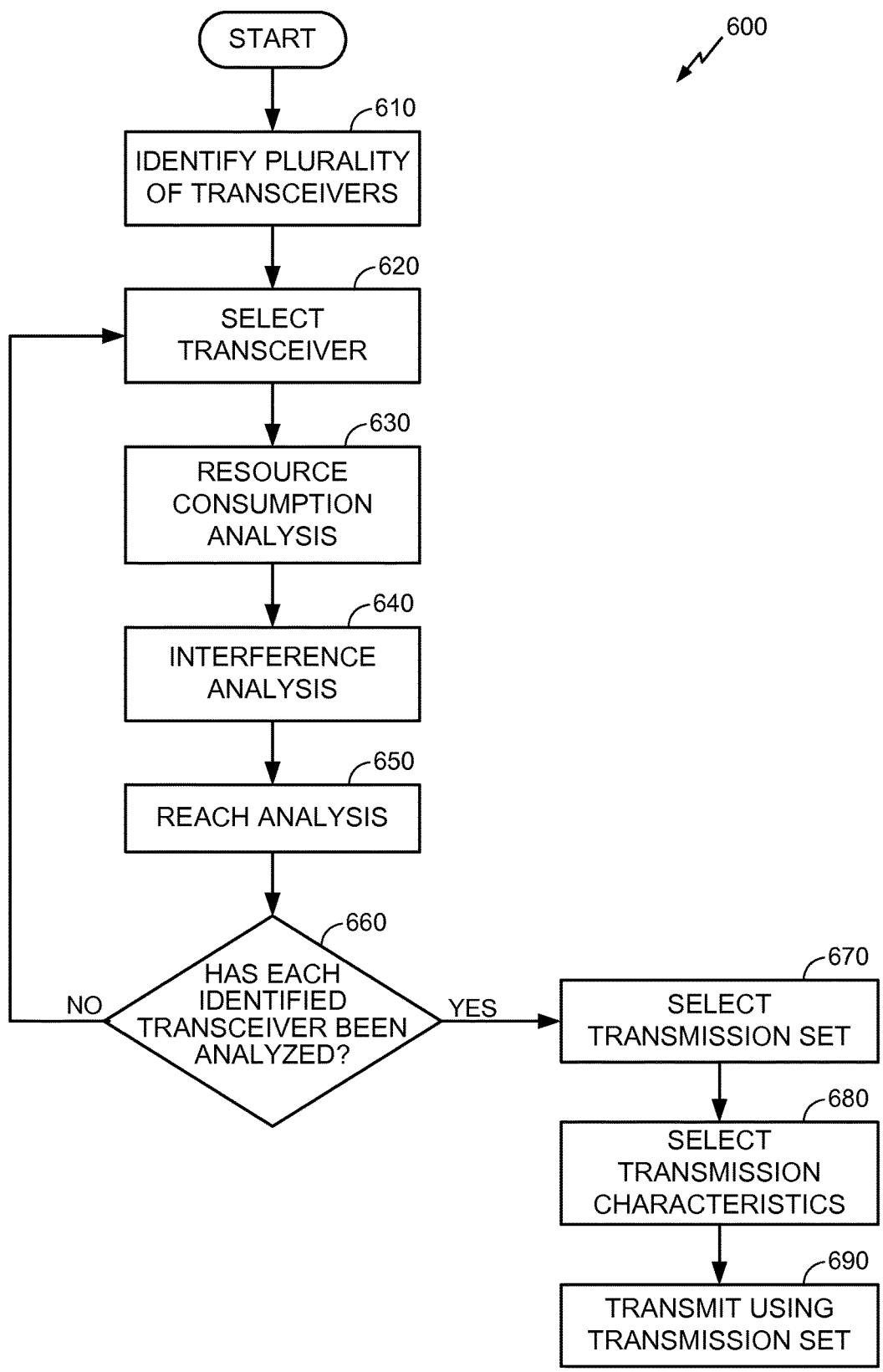
FIG. 6 generally illustrates a flow diagram for optimizing the reach of a message beacon device in accordance with another aspect of the disclosure.

FIG. 6 generally illustrates a method 600 for optimizing the reach of a messaging beacon device in accordance with another aspect of the disclosure. The method 600 may be performed by, for example, the message beacon device 110 of FIG. 1 or the message beacon device 210 of FIG. 2. For the purposes of illustration, the method 600 will be described in further detail as it would be performed by the message beacon device 210 of FIG. 2.

At 610, the message beacon device 210 identifies a plurality of transceivers associated with the message beacon device 210. The identification at 610 may be analogous to the identification at 510. In one possible scenario, every transceiver included in the communication device 220 is identified. For example, a list of the transceivers included in the communication device 220 may be stored in the memory component 242 and retrieved by the communication controller 230 at 610. Additionally or alternatively, the communication device 220 or communication controller 230 may identify the transceivers that are currently available for transmission of message beacons (e.g., operating normally).

At 620, the message beacon device 210 selects a single transceiver from the plurality of transceivers identified at 610. As will be described in greater detail below, the method 600 will proceed to analyze the selected transceiver on the basis of resource consumption (at 630), interference with other transceivers (at 640), and reach (at 650). Then (at 660), the method 600 will optionally cycle back to 620 until, for example, each transceiver of the plurality of transceivers identified at 610 has been selected. It will be understood that at each iteration of 620, the message beacon device 210 will select a transceiver that has not already been selected and analyzed during a previous iteration.

At 630, the message beacon device 210 analyzes the selected transceiver on the basis of resource consumption. The resource consumption analysis of 630 may be concerned with, for example, the type of power supply with which the message beacon device 210 is equipped (constant, depleting, primary, auxiliary, etc.), the rate of power consumption associated with the power supply (high power consumption rate, low power consumption rate, etc.), the transmission interval or transmit power for transmitting message beacons (high message beacon transmission interval, low message beacon transmission interval, etc., analyzed using milliwatts per second, milliwatts per message beacon, message beacons per second, etc.), and/or the ranges of selectable transmission intervals or transmit power. The analysis may be performed in accordance with, for example, the method 700 of FIG. 7, described elsewhere in the present disclosure.

At 640, the message beacon device 210 analyzes the selected transceiver on the basis of interference. The interference analysis of 640 may be concerned with, for example, the actual or estimated effect of operations of the selected transceiver on other identified transceivers. The estimating can be performed in any suitable manner. The analysis may be performed in accordance with, for example, the method 800 of FIG. 8, described elsewhere in the present disclosure.

At 650, the message beacon device 210 analyzes the selected transceiver on the basis of reach. The interference analysis of 640 may be concerned with, for example, the number of wireless devices with which the transceiver, if selected, will be able to utilize a P2P link (for example, P2P links 122, 124, 126, 132, etc.). Additionally or alternatively, the interference analysis of 640 may be concerned with a number of additional wireless devices with which the transceiver, if selected, will be able to utilize a P2P link (for example, additional wireless devices with which a P2P link has not already been utilized, and/or additional wireless devices that cannot be reached using any of the other identified transceivers). The analysis may be performed in accordance with, for example, the method 900 of FIG. 9, described elsewhere in the present disclosure.

It will be understood that although the resource consumption analysis of 630, interference analysis 640, and reach analysis 650 of FIG. 6 are depicted in a specific order, they may be performed in any order. Additionally or alternatively, any of resource consumption analysis of 630, interference analysis 640, and reach analysis 650 may be performed simultaneously.

At 660, the message beacon device 210 determines whether to loop back and select a different transceiver for analysis at 620. In one possible implementation (depicted in FIG. 6), the message beacon device 210 is configured to analyze each of the transceivers identified at 610. In this implementation, the method 600 loops back until each of the identified transceivers has been analyzed. Once the message beacon device 210 determines that additional analysis is unnecessary, the method 600 proceeds to 670.

At 670, the message beacon device 210 selects a transmission set from the plurality of transceivers identified at 610. The selected transceivers may be selected on the basis of the resource consumption analysis of 630, the interference analysis 640, and/or the reach analysis of 650. In one possible implementation, each transceiver is selected or not selected for the transmission set on the basis of the analysis performed on that transceiver. In another possible implementation, a set of transceivers is selected for the transmission set on the basis of the overall analysis of all of the analyzed transceivers.

For example, a transceiver may be included in the selected transmission set in response to a determination that a resource consumption indicator is less than a first resource consumption threshold, or excluded from the selected transmission set in response to a determination that the resource consumption indicator is greater than a second resource consumption threshold. As another example, a transceiver may be included in the selected transmission set in response to a determination that the interference indicator is less than a first interference threshold, or excluded from the selected transmission set in response to a determination that the resource consumption indicator is greater than a second interference threshold. As yet another example, a transceiver may be included in the selected transmission set in response to a determination that the reach indicator is greater than a first reach threshold, or excluded from the analyzed transceiver from the selected transmission set in response to a determination that the resource consumption indicator is less than a second reach threshold.

At 680, the message beacon device 210 selects transmission characteristics for one or more of the transceivers selected for the transmission set. The transmission characteristics may include, for example, a transmission power of the message beacons, a transmission interval of the message beacons, a timing of the message beacons, a frequency or set of frequencies over which the transceiver operates, etc. The transmission characteristics may be selected on the basis of the resource consumption analysis of 630, the interference analysis 640, and/or the reach analysis of 650. In one possible implementation, transmission characteristics for a given transceiver are selected on the basis of the analysis performed on that transceiver. In another possible implementation, transmission characteristics for a given transceiver are selected on the basis of the analysis of all of the analyzed transceivers.

In some implementations, the transmission set selection at 670 and the transmission characteristics selection at 680 may be interdependent. For example, suppose that a given transceiver will cause intolerable interference with another transceiver if it is operated in accordance with a certain set of transmission characteristics, but will not create intolerable interference if it is operated in accordance with a different set of transmission characteristics (lower transmission power, different frequency, etc.). In this example, the transceiver would be included in the transmission set, but the transmission characteristics of the transceiver may be set such that the interference (actual or estimated) is set to a low level.

In some implementations, transmission characteristics are selected by simply retrieving data on baseline (default) transmission characteristics from, for example, a local memory of the message beacon device 210 (for example, memory component 242). Additionally or alternatively, the message beacon device 210 may adjust the transmission characteristics as required.

At 690, the message beacon device 210 transmits message beacons using the transmission set selected at 670 and the transmission characteristics selected at 680. By performing the method 600, the message beacon device 210 optimizes the reach of the message beacon device 210. Accordingly, the message beacon device 210 strikes a suitable balance between resource consumption and reach while accounting for the possibility of self-interference. The method 600 may be repeated, for example, continuously, intermittently as needed, or periodically.

Figure 7:
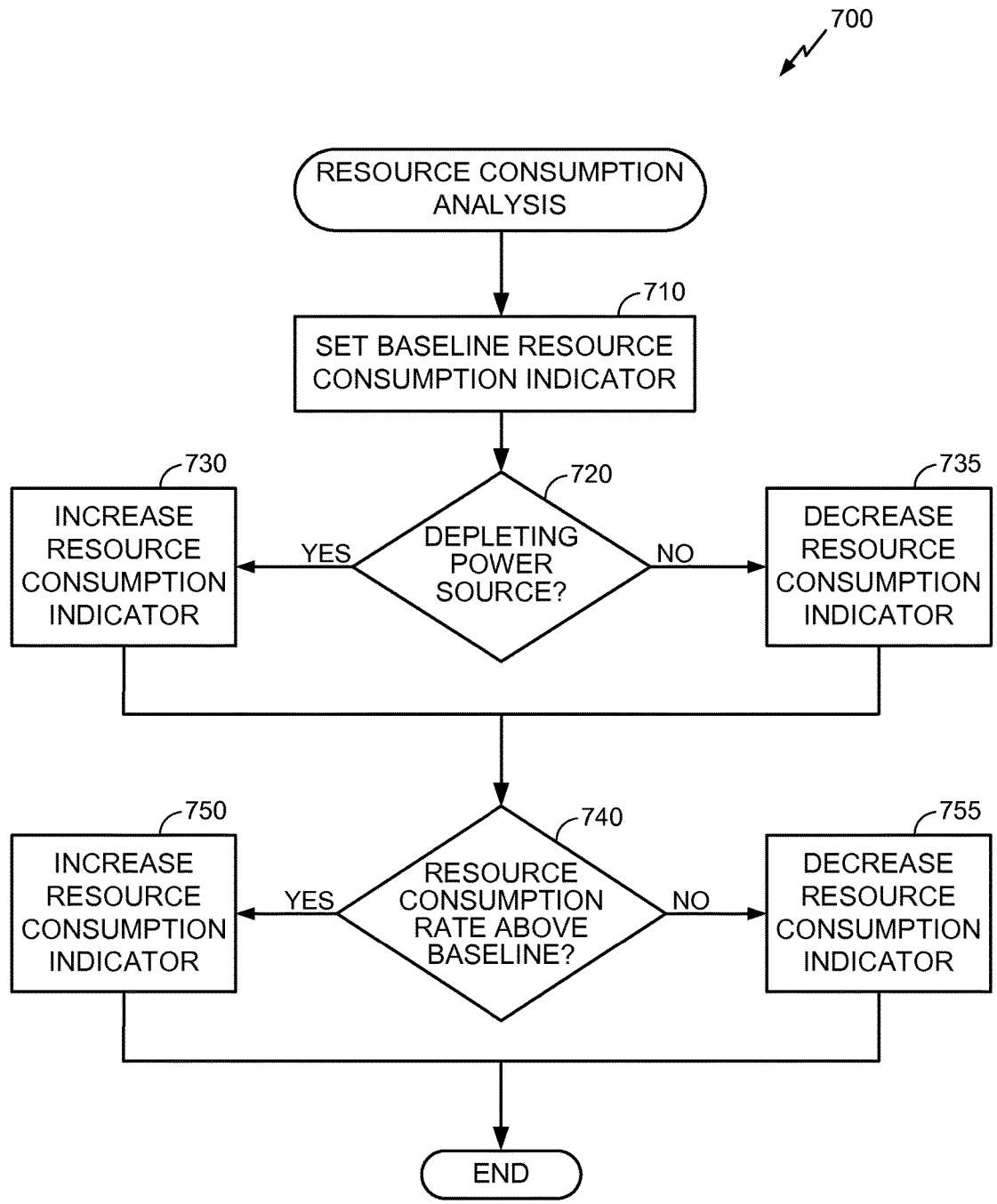
FIG. 7 generally illustrates a flow diagram for analyzing the resource consumption of a message beacon device in accordance with an aspect of the disclosure.

FIG. 7 generally illustrates a method 700 for analyzing the resource consumption associated with a transceiver in a message beacon device in accordance with an aspect of the disclosure. The method 700 may be performed by, for example, the message beacon device 110 of FIG. 1 or the message beacon device 210 of FIG. 2. The method 700 may be performed in order to analyze resource consumption as set forth in method 600 of FIG. 6 (at 630). In one possible implementation, the method 700 is performed by the transceiver analyzer 232 included in the communication controller 230 of the message beacon device 210. For the purposes of illustration, the method 700 will be described in further detail as it would be performed by the transceiver analyzer 232 of FIG. 2.

At 710, the message beacon device 210 sets a baseline resource consumption indicator. In some implementations, the baseline resource consumption indicator is selected by simply retrieving data from, for example, a local memory of the message beacon device 210 (for example, memory component 242). The message beacon device 210 may adjust the baseline resource consumption indicator as set forth below.

At 720, the message beacon device 210 determines the type of power supply with which the message beacon device 210 is equipped. Based on the power supply determination 720, the message beacon device 210 will adjust the resource consumption indicator. For example, if the power supply is a depleting power supply (for example, a battery, energy harvester, etc.), then the message beacon device 210 may increase the resource consumption indicator (as in 730, described below). On the other hand, if the power supply is a constant power supply (for example, a hard-wired electrical outlet, etc.), then the message beacon device 210 may decrease the resource consumption indicator (as in 735, described below).

The resource consumption indicator may be used by the message beacon device 210 to determine the cost of selecting a given transceiver. If the resource consumption indicator is high, then this indicates that the cost of resource consumption is high. For example, if the message beacon device 210 is equipped with a depleting power supply (for example, a battery, energy harvester, etc.), then the cost of operating on multiple transceivers may be high. By contrast, if the message beacon device 210 is equipped with a constant power supply, then resource consumption may not be a factor in determining whether to operate on a large number of transceivers. The low cost of resource consumption is reflected in the low value of the resource consumption indicator.

The degree to which the resource consumption indicator is increased or decreased may be set arbitrarily. On the other hand, the increase or decrease of the resource consumption indicator may be variable and may reflect the cost of consuming additional resources. Accordingly, rather than a simple 'yes' or 'no' determination followed by a set increase or set decrease (as depicted in FIG. 7), the message beacon device 210 may apply a variable adjustment based on the specific type of power supply.

In some implementations, the message beacon device 210 may have a single power supply. In this implementation, an independent power supply determination 720 may not be necessary for every transceiver in the message beacon device 210. Accordingly, if the power supply determination 720 is incorporated into the method 700, then it may be performed only once rather than for each transceiver.

At 730, the message beacon device 210 increases the resource consumption indicator, and at 735, the message beacon device 210 decreases the resource consumption indicator. As noted above, the message beacon device 210 determines a baseline resource consumption indicator at 710. As can be understood from FIG. 7, the message beacon device 210 then adjusts the baseline resource consumption indicator upwards or downwards based on the power supply determination at 720.

At 740, the message beacon device 210 determines the resource consumption rate associated with the transceiver. Based on the consumption rate determination at 740, the message beacon device 210 will adjust the resource consumption indicator. For example, if the transceiver being analyzed (for example, the transceiver selected at 620 of FIG. 6) is associated with a high rate of power consumption, then the message beacon device 210 may increase the resource consumption indicator (as in 750, described below). On the other hand, if the transceiver being analyzed (for example, the transceiver selected at 620 of FIG. 6) is associated with a low rate of power consumption, then the message beacon device 210 may decrease the resource consumption indicator (as in 755, described below).

It will be understood that many variables can affect the resource consumption rate of a transceiver. For example, LTE-D may have a greater range than Bluetooth. Accordingly, the resource consumption rate for LTE-D may be higher than the resource consumption rate for Bluetooth. As a result, if the transceiver being analyzed is an LTE transceiver, then the resource consumption indicator may be increased (as in 750), whereas if the transceiver being analyzed is a Bluetooth transceiver, then the resource consumption indicator may be decreased (as in 755).

Additionally or alternatively, the transceiver may be operating in accordance with a low transmission interval (i.e., transmission of a high number of message beacons per unit time) or a high transmission interval (i.e., transmission of a low number of message beacons per unit time). It will be understood that a lower transmission interval will result in greater resource consumption, and that a higher transmission interval will result in low resource consumption.

In some implementations, the consumption rate determination at 740 is performed through a simple comparison to a baseline resource consumption rate. The baseline resource consumption rate used in 740 may be retrieved from, for example, a local memory of the wireless device message beacon device 210 (for example, memory component 242). The baseline resource consumption rate may be set equal to a resource consumption rate that does not merit increase or decrease of the resource consumption indicator (for example, an average resource consumption rate of a conventional mid-range transceiver). If the resource consumption rate associated with the analyzed transceiver is higher (or lower) than the baseline, the resource consumption indicator may be, for example, increased (or decreased) by a set amount, as depicted in FIG. 7.

In another implementation, the message beacon device 210 may apply a variable adjustment that is proportional to the resource consumption rate of the analyzed transceiver. For example, if the resource consumption rate associated with the analyzed transceiver is much higher (or much lower) than the baseline, the resource consumption indicator may be, for example, greatly increased (or greatly decreased). The resource consumption rate may be determined based on, for example, actual measurements of the rate of resource consumption based on actual transceiver operations, or predetermined values or estimates based on transceiver specifications, practical experience, etc.

As noted above, the method 700 may constitute a subroutine in the performance of the method 600. In particular, the method 700 may be a particular method for analyzing resource consumption, as in 630 of FIG. 6. The result of method 700 may be a resource consumption indicator that is associated with a particular transceiver. The resource consumption indicator is high when the cost of operating a particular transceiver is high, and low when the cost of operating a particular transceiver is low. If the cost of operating a particular transceiver is high (i.e., it is associated with a high resource consumption indicator based on the resource consumption analysis), then the message beacon device 210 is less likely to include that transceiver in the transmission set selected at 670. On the other hand, a transceiver that is associated with a low operating cost is more likely to be added.

Figure 8:
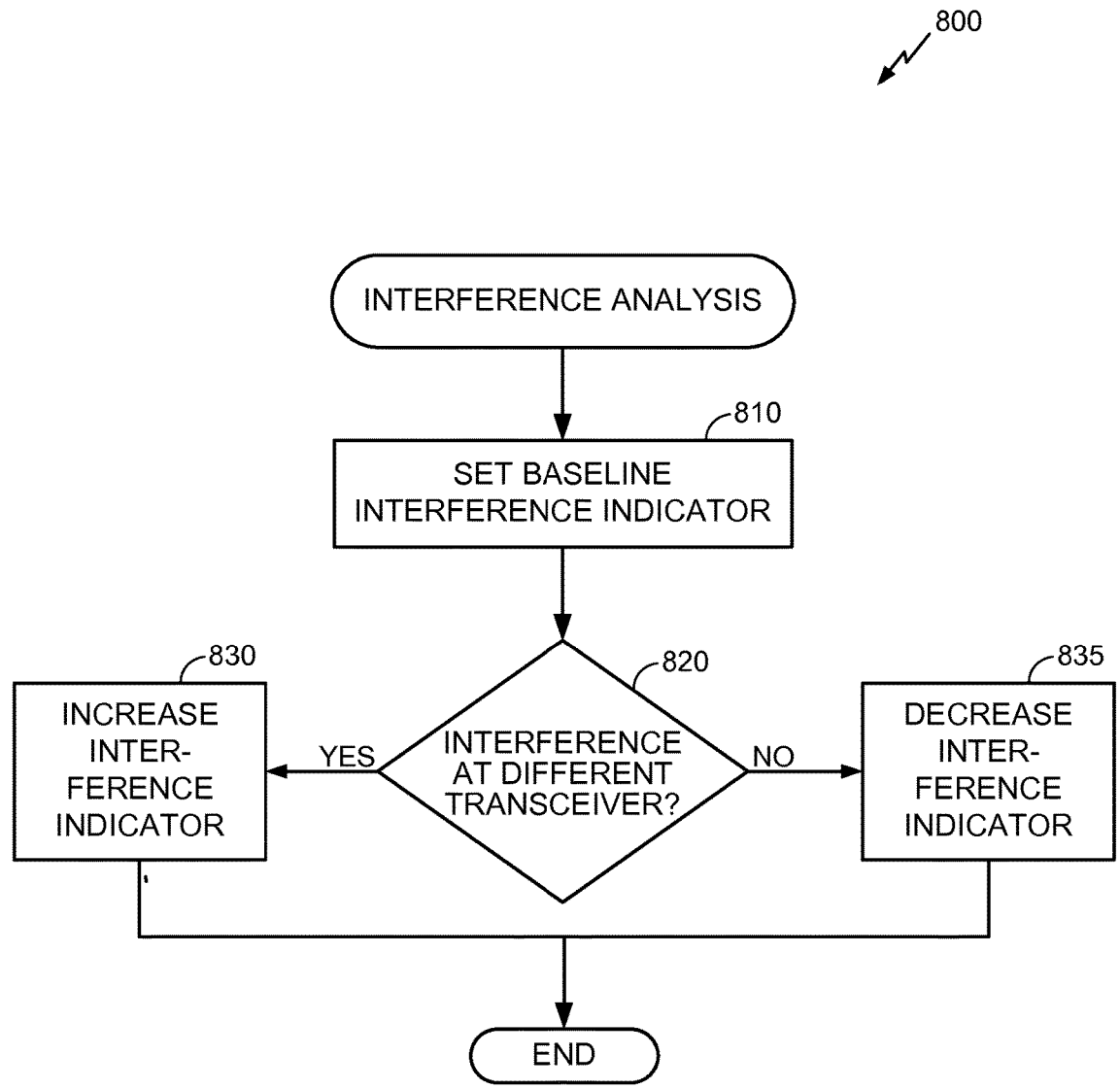
FIG. 8 generally illustrates a flow diagram for analyzing the interference of a message beacon device in accordance with an aspect of the disclosure.

FIG. 8 generally illustrates a method 800 for analyzing the interference associated with a transceiver in a message beacon device in accordance with an aspect of the disclosure. The method 800 may be performed by, for example, the message beacon device 110 of FIG. 1 or the message beacon device 210 of FIG. 2. The method 800 may be performed in order to analyze interference as set forth in method 600 of FIG. 6 (at 640). In one possible implementation, the method 800 is performed by the transceiver analyzer 232 included in the communication controller 230 of the message beacon device 210. For the purposes of illustration, the method 800 will be described in further detail as it would be performed by the transceiver analyzer 232 of FIG. 2.

At 810, the message beacon device 210 sets a baseline interference indicator. In some implementations, the baseline resource consumption indicator is selected by simply retrieving data from, for example, a local memory of the wireless device message beacon device 210 (for example, memory component 242). The message beacon device 210 may adjust the baseline interference consumption indicator as set forth below.

At 820, the message beacon device 210 determines whether operations of the particular transceiver being analyzed will cause interference with another transceiver associated with the message beacon device 210. Based on the interference determination at 820, the message beacon device 210 will adjust the resource consumption indicator. For example, if operating the transceiver is likely to cause interference with the operations of another transceiver, then the message beacon device 210 may increase the interference indicator (as in 830, described below). On the other hand, if there are no interference issues, then the message beacon device 210 may decrease the interference indicator (as in 835, described below).

The interference indicator may be used by the message beacon device 210 to determine the cost of selecting a given transceiver. If the interference indicator is high, then this indicates that the cost of the interference is high. For example, if operations of the analyzed transceiver will interfere will the operations of another transceiver, then the other transceiver may respond by increasing its transmission power in order to maintain P2P links (or potential P2P links). Accordingly, the resource consumption associated with the message beacon device 210 will increase. As another example, the other transceiver may respond to the interference by decreasing its transmission interval. This too can cause the resource consumption associated with the message beacon device 210 to increase.

Additionally or alternatively, the other transceiver may not be able to increase transmission power or decrease its transmission interval. As a result, the other transceiver may not be able to maintain one or more P2P links. In this scenario, the reach of the other transceiver is jeopardized by the interference caused by the analyzed transceiver. Accordingly, the interference indicator associated with the analyzed transceiver may be increased.

The degree to which the increased indicator is increased or decreased may be set arbitrarily. On the other hand, the increase or decrease of the interference indicator may be variable and may reflect the degree of interference. Accordingly, rather than a simple 'yes' or 'no' determination followed by a set increase or set decrease (as depicted in FIG. 8), the message beacon device 210 may apply a variable adjustment based on the amount of interference.

At 830, the message beacon device 210 increases the interference indicator, and at 835, the message beacon device 210 decreases the interference indicator. As noted above, the message beacon device 210 determines a baseline resource consumption indicator at 810. As can be understood from FIG. 8, the message beacon device 210 then adjusts the baseline interference indicator upwards or downwards based on the interference determination at 820.

In some implementations, the message beacon device 210 may increase the interference indicator in response to a determination at 820 that the amount of interference caused by the analyzed transceiver will exceed an arbitrary interference threshold. The interference threshold may be a non-zero value that reflects substantial interference. In other implementations, the message beacon device 210 may apply a variable adjustment that is proportional to the amount of interference. For example, if the interference associated with the analyzed transceiver is much higher (or much lower) than the baseline, the interference indicator may be, for example, greatly increased (or greatly decreased). The interference may be determined by measuring interference at other transceivers, or based on predetermined values or estimates based on transceiver specifications, practical experience, etc. Predetermine values or estimates based on transceiver specification, practical experience, etc. may be stored in a lookup table that can be accessed by the message beacon device 210 as needed.

As noted above, the method 800 may constitute a subroutine in the performance of the method 600. In particular, the method 800 may be a particular method for analyzing interference, as in 640 of FIG. 6. The result of method 800 may be an interference indicator that is associated with a particular transceiver. The interference indicator is high when it negatively impacts the reach of another transceiver, or when it increases the amount of resource consumption necessary to maintain the reach of the other transceiver. If the interference caused by a particular transceiver is high (i.e., it is associated with a high interference indicator based on the interference analysis), then the message beacon device 210 is less likely to include that transceiver in the transmission set selected at 670. On the other hand, a transceiver that is associated with low interference is more likely to be added.

Figure 9:
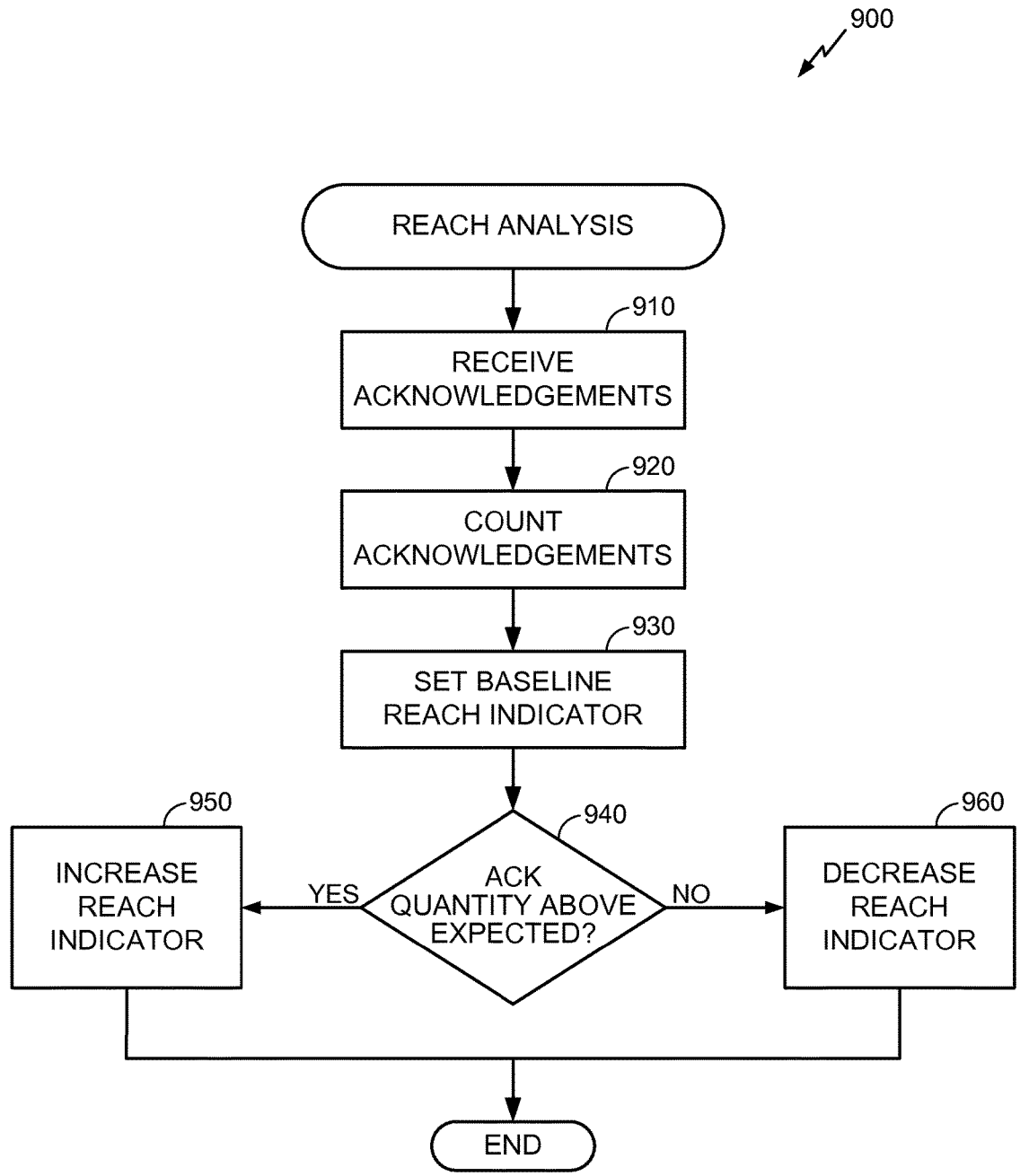
FIG. 9 generally illustrates a flow diagram for analyzing the reach of a message beacon device in accordance with an aspect of the disclosure.

FIG. 9 generally illustrates a method 900 for analyzing the reach associated with a transceiver in a message beacon device in accordance with an aspect of the disclosure. The method 900 may be performed by, for example, the message beacon device 110 of FIG. 1 or the message beacon device 210 of FIG. 2. Alternatively, the method 900 may be performed by an external server (for example, a cloud server). In one possible implementation, the external server determines the reach of the message beacon device 110 and transmits the results of the determination to the message beacon device 110. In another possible implementation, a message beacon includes one or more reach parameters, which are relayed to the external server via a wireless device. The external server may process the reach parameters and change a configuration of the message beacon device 110. For example, the external server may turn off a protocol or application, lower a duty cycle of transmissions, etc.

The method 900 may be performed in order to analyze reach as set forth in method 600 of FIG. 6 (at 650). In one possible implementation, the method 900 is performed by the transceiver analyzer 232 included in the communication controller 230 of the message beacon device 210. For the purposes of illustration, the method 900 will be described in further detail as it would be performed by the transceiver analyzer 232 of FIG. 2. At 910, the message beacon device 210 receives acknowledgements. In some implementations, a wireless device that receives a message beacon transmitted by the message beacon device 210 will respond by transmitting an acknowledgement. In such an implementation, the message beacon device 210 is able to determine how many wireless devices are being reached by a particular transceiver.

For example, in the scenario of FIG. 1, the message beacon device 110 might send a message beacon using both the first transceiver (analogous, for example, to the first transceiver 222 of FIG. 2) and the third transceiver (analogous, for example, to the third transceiver 226 of FIG. 2). In this example, the message beacon sent by the first transceiver would reach the wireless device 120 (via first P2P link 122) and wireless device 130 (via P2P link 132), whereas the message beacon sent by the third transceiver would reach the wireless device 120 (via third P2P link 126), the wireless device 140 (via third P2P link 146), and the wireless device 160 (via third P2P link 166). If the respective wireless devices are configured to respond with acknowledgements, then the message beacon device 110 may receive, via the first transceiver, acknowledgements from the wireless devices 120 and 130, and may receive, via the third transceiver, acknowledgements from the wireless device 120, 140, and 160.

At 920, the message beacon device 210 counts the acknowledgements received at 910. The reach of a particular transceiver can be determined by analyzing the number of acknowledgements received at by that transceiver. Accordingly, the message beacon device 210 can determine the reach of each transceiver by counting the acknowledgements at 920.

The number of received acknowledgements may be calculated as, for example, a number of acknowledgements received over a set period of time (the past thirty seconds, the past five minutes, etc.). The number of acknowledgements may also be a number of acknowledgements from a unique wireless device—for example, if ten acknowledgements are received from a single wireless device over the set period of time, then this may count as a single unique acknowledgement.

In yet another implementation, a list of wireless devices that respond with acknowledgements on a particular transceiver may be compared to a list of wireless devices that respond with acknowledgements on the other transceivers. The message beacon device 210 may count (at 920) only the additional wireless devices that can only be reached exclusively through the operations of the analyzed transceiver. For example, the wireless device 160 depicted in FIG. 1 can only receive a message beacon (and respond with an acknowledgement) using the third P2P link 166. Although the message beacon device 210 may also receive an acknowledgement on third P2P link 126 and third P2P link 146 (from the wireless devices 120 and 140, respectively), it may determine that the wireless devices 120 and 140 can be reached using other transceivers (via P2P links 122, 124, 144). Therefore, although three difference wireless devices can be reached using the third transceiver (wireless devices 120, 140, 160), there is only one additional wireless device that is reached exclusively by the third transceiver (wireless device 160).

At 930, the message beacon device 210 sets a baseline reach indicator. Like the baseline resource consumption indicator and baseline interference indicator, the baseline reach indicator can be adjusted upward or downward (increased or decreased) based on the analysis performed in the method 900. In some implementations, the baseline reach indicator is retrieved from, for example, a local memory of the wireless device message beacon device 210 (for example, memory component 242). The baseline reach indicator may be set equal to a number of acknowledgements that does not merit increase or decrease of the reach indicator (for example, a number of received acknowledgements that justifies the cost of transmitting a message beacon). The baseline reach indicator may be specific to the transceiver being analyzed. If the number of received acknowledgements associated with the analyzed transceiver is higher (or lower) than the baseline, the reach indicator may be, for example, increased (or decreased) by a set amount, as depicted in FIG. 9.

In another implementation, the message beacon device 210 may apply a variable adjustment that is proportional to the number of acknowledgements received by the analyzed transceiver. For example, if the number of acknowledgements associated with the analyzed transceiver is much higher (or much lower) than the baseline, the reach indicator may be, for example, greatly increased (or greatly decreased).

At 940, the message beacon device 210 determines whether the number of received acknowledgements is above an expected number of received acknowledgements. For example, suppose that the expected number of received acknowledgements is two acknowledgements. If the message beacon device 210 counts three acknowledgements, then the message beacon device 210 can determine that the reach of the particular transceiver being analyzed is high, and the reach indicator can be increased (as in 950, described below). On the other hand, if the message beacon device 210 counts one acknowledgement, then the message beacon device 210 can determine that the reach of the particular transceiver being analyzed is low, and the reach indicator can be decreased (as in 960, described below).

In one possible implementation, the expected number of received acknowledgements is set to the number of acknowledgements actually received in a previous iteration of the method 900, and the baseline reach indicator is set to the reach indicator that was ultimately arrived at in a previous iteration of the method 900. Accordingly, if the number of acknowledgements received in a given iteration exceeds the number of acknowledgements received in a previous iteration, then the reach indicator may be increased, and if the number of acknowledgements received in a given iteration falls short of the number of acknowledgements received in a previous iteration, then the reach indicator may be decreased. As noted above, not every wireless device that receives a message beacon will transmit an acknowledgement in return. For example, when a unicast message beacon is received by a wireless device, the wireless device will typically send an acknowledgement, whereas the wireless device may not send an acknowledgement in response to a broadcast message beacon. However, the message beacon device may be configured to request an acknowledgement regardless of whether it is transmitting in a unicast, multicast or broadcast mode. Moreover, in some implementations, the message beacon may be used to prompt the user to voluntarily send an acknowledgement. Accordingly, a number of received acknowledgements can be used to estimate the reach of a transceiver, even if fewer than 100% of the wireless devices that receive a message beacon actually send an acknowledgement.

The degree to which the reach indicator is increased or decreased may be set arbitrarily. On the other hand, the increase or decrease of the reach indicator may be variable and may reflect the benefit of reaching a specific number of additional wireless devices. Accordingly, rather than a simple 'yes' or 'no' determination followed by a set increase or set decrease (as depicted in FIG. 9), the message beacon device 210 may apply a variable adjustment based on the number of wireless devices reached.

At 950, the message beacon device 210 increases the reach indicator, and at 960, the message beacon device 210 decreases the reach indicator. As noted above, the message beacon device 210 determines a baseline reach indicator at 930. As can be understood from FIG. 9, the message beacon device 210 then adjusts the baseline reach indicator upwards or downwards based on the acknowledgement determination 940.

As noted above, the method 900 may constitute a subroutine in the performance of the method 600. In particular, the method 900 may be a particular method for analyzing reach, as in 650 of FIG. 6. The result of method 900 may be a reach indicator that is associated with a particular transceiver. The reach indicator is high when the benefit of operating a particular transceiver is high, and low when the benefit of operating a particular transceiver is low. If the benefit of operating a particular transceiver is high (i.e., it is associated with a high reach indicator based on the reach analysis), then the message beacon device 210 is more likely to include that transceiver in the transmission set selected at 670. On the other hand, a transceiver that is associated with low reach is less likely to be added.

It will be understood that there are additional ways to analyze reach. Acknowledgements may not always be received, especially in scenarios where a particular transceiver relies heavily on multicast or broadcast transmission modes (i.e., transmission modes that sometimes do not request acknowledgements). As a result, the reach analysis for some transceivers may also rely on different methods of analyzing reach. For example, the range of a transceiver can be used to estimate reach. All else being equal, a transceiver that transmits message beacons a greater distance will reach more wireless devices. Accordingly, the reach of a transceiver can be estimated based on the geographic range of the transceiver.

As another example, the vendor/manufacturer of a transceiver can be used to estimate reach. For example, the message beacon device may send message beacons using a vendor- or manufacturer-specific proprietary mechanism. In this scenario, only wireless devices that are configured to operate in accordance with the proprietary mechanism will receive the message beacons. All else being equal, a transceiver that transmits message beacons in accordance with a proprietary mechanism will reach fewer wireless devices. Accordingly, the reach indicator of a particular transceiver may be set based on a vendor or manufacturer with which the transceiver is associated. By setting the reach indicator in view of proprietary mechanisms, the message beacon device 210 can determine a better estimate of the reach of the transceiver.

As yet another example, a single transceiver could operate based on a first protocol or application as well as a second protocol or application (for example, using both proprietary mechanisms). If operations based on one protocol or the other results in greater reach and resources are scarce, then operations based on the other protocol may be discontinued.

In one possible implementation, the baseline reach indicator is set at 930 based on a geographic range and/or proprietary mechanism associated with the transceiver being analyzed. The reach indicator may then be increased or decreased (950, 960) in the event that reach can be further analyzed in terms of acknowledgements.

Returning to FIG. 6, it will be understood that the selection of a transmission set at 670 is dependent upon one or more of the resource consumption analysis performed at 630, the interference analysis performed at 640, and the reach analysis performed at 650. Accordingly, the message beacon device 210 may perform any of the methods 700, 800, or 900 as a subroutine correlating to the analyses performed at 630, 640, and 650, respectively.

As noted above, the output of the analyses performed at 630, 640, and 650 is a resource consumption indicator, an interference indicator, and a reach indicator. In some scenarios, the analyses 630, 640, 650 are repeated for each transceiver of the plurality of transceivers identified at 610. The result may be comprehended as an array wherein each of the plurality of transceivers is associated with each of the three different indicators. Accordingly, the transmissions set may be selected at 670 in accordance with the array of values.

As noted above, the resource consumption indicator reflects the cost of operating a particular transceiver. Accordingly, if a particular transceiver has a low resource consumption indicator, then there is an increasing chance that the message beacon device 210 will select that transceiver for operations at 670. Similarly, the reach indicator reflects the benefit of operating a particular transceiver. Accordingly, if a particular transceiver has a high reach indicator, then there is an increasing change that the message beacon device 210 will select that transceiver for operations at 670. If the interference indicator for a particular transceiver is high, this may reflect either a greater cost or a reduced benefit. Accordingly, if a particular transceiver has a low interference indicator, then there is an increasing chance that the message beacon device 210 will select that transceiver for operations at 670.

The message beacon device 210 may strike a balance between the varying indicators using, for example, a scoring system. The scoring may be arbitrarily determined based on practical considerations. In one of many possible implementations of a scoring system, the reach indicator (reflecting positive results) is compared to the inverse of the sum of the resource consumption indicator and interference indicators (reflecting negative results). In the case of a positive result, the transceiver is selected for the transmission set, and in the case of a negative result, the transceiver is not selected for the transmission set. It will be understood that other implementations are possible. For example, the indicators may have arbitrarily assigned weights.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., wireless device). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for optimizing the reach of a message beacon device, comprising:
   identifying a plurality of transceivers associated with the message beacon device;
   analyzing each identified transceiver on the basis of a resource consumption associated with the identified transceiver, an interference of the identified transceiver with a different transceiver of the plurality of identified transceivers, a reach of the identified transceiver, or a combination thereof;
   selecting a transmission set for transmission of a message beacon from the plurality of identified transceivers based on the analysis of each identified transceiver, wherein selecting the transmission set comprises excluding at least one transceiver of the plurality of transceivers from the selected transmission set; and
   transmitting the message beacon using each selected transceiver in the transmission set.

2. The method of claim 1, wherein:
   analyzing each identified transceiver comprises determining a resource consumption indicator associated with operation of each identified transceiver; and
   selecting a transmission set comprises, for each analyzed transceiver:

including the analyzed transceiver in the selected transmission set in response to a determination that the resource consumption indicator is less than a first resource consumption threshold; and
excluding the analyzed transceiver from the selected transmission set in response to a determination that the resource consumption indicator is greater than a second resource consumption threshold.

3. The method of claim 2, wherein determining the resource consumption indicator comprises:
determining whether the message beacon device is associated with a constant power supply or a depleting power supply;
increasing the resource consumption indicator in response to a determination that the message beacon device is associated with the depleting power supply; and
decreasing the resource consumption indicator in response to a determination that the message beacon device is associated with the constant power supply.

4. The method of claim 2, wherein determining the resource consumption indicator comprises:
determining a power consumption rate associated with each identified transceiver;
increasing the resource consumption indicator in response to a determination that the identified transceiver is associated with a high power consumption rate; and
decreasing the resource consumption indicator in response to a determination that the identified transceiver is associated with a low power consumption rate.

5. The method of claim 2, wherein determining the resource consumption indicator comprises:
determining a message beacon transmission interval associated with each identified transceiver;
increasing the resource consumption indicator in response to a determination that the identified transceiver is associated with a high message beacon transmission interval; and
decreasing the resource consumption indicator in response to a determination that the identified transceiver is associated with a low message beacon transmission interval.

6. The method of claim 1, wherein:
analyzing each identified transceiver comprises determining an interference indicator associated with operation of each identified transceiver; and
selecting a transmission set comprises, for each analyzed transceiver:
including the analyzed transceiver in the selected transmission set in response to a determination that the interference indicator is less than a first interference threshold; and
excluding the analyzed transceiver from the selected transmission set in response to a determination that the resource consumption indicator is greater than a second interference threshold.

7. The method of claim 6, wherein determining an interference indicator associated with operation of each identified transceiver comprises:
estimating an interference value reflecting interference caused at the different transceiver by message beacon transmission from each identified transceiver;
increasing the interference indicator in response to a determination that the identified transceiver is associated with a high level of interference; and
decreasing the interference indicator in response to a determination that the identified transceiver is associated with a low level of interference.

8. The method of claim 7, wherein estimating the interference value comprises:
measuring the interference value caused by message beacon transmission; or
determining the interference value from a lookup table based on a radio access technology associated with the identified transceiver, a message beacon transmission interval associated with the identified transceiver, a transmission power associated with the identified transceiver, or a combination thereof.

9. The method of claim 1, wherein:
analyzing each identified transceiver comprises determining a reach indicator associated with operation of each identified transceiver; and
selecting a transmission set comprises, for each analyzed transceiver:
including the analyzed transceiver in the selected transmission set in response to a determination that the reach indicator is greater than a first reach threshold; and
excluding the analyzed transceiver from the selected transmission set in response to a determination that the resource consumption indicator is less than a second reach threshold.

10. The method of claim 9, wherein determining a reach indicator comprises:
receiving acknowledgements using each identified transceiver;
counting the number of received acknowledgements;
increasing the reach indicator in response to a determination that the identified transceiver is associated with a high number of received acknowledgements; and
decreasing the reach indicator in response to a determination that the identified transceiver is associated with a low number of received acknowledgements.

11. The method of claim 9, wherein determining a reach indicator comprises:
identifying a vendor, manufacturer, or message beacon protocol associated with each identified transceiver; and
setting the reach indicator associated with each identified transceiver based on the identified vendor, manufacturer, or message beacon protocol.

12. A message beacon device, comprising:
a plurality of transceivers associated with the message beacon device;
one or more processors; and
memory coupled to the one or more processors and configured to store data, instructions, or a combination thereof,
wherein the one or more processors are configured to:
identify each of the plurality of transceivers and analyze each identified transceiver on the basis of a resource consumption associated with the identified transceiver, an interference of the identified transceiver with a different transceiver of the plurality of identified transceivers, a reach of the identified transceiver, or a combination thereof;
select a transmission set for transmission of a message beacon from the plurality of identified transceivers based on the analysis of each identified transceiver, wherein selecting the transmission set comprises excluding at least one transceiver of the plurality of transceivers from the selected transmission set; and
provide the message beacon to each selected transceiver in the selected transmission set.

13. The message beacon device of claim 12, wherein the one or more processors are further configured to:
determine a resource consumption indicator associated with operation of each identified transceiver; and
for each analyzed transceiver:
include the analyzed transceiver in the transmission set in response to a determination that the resource consumption indicator is less than a first resource consumption threshold; and
exclude the analyzed transceiver from the transmission set in response to a determination that the resource consumption indicator is greater than a second resource consumption threshold.

14. The message beacon device of claim 13, wherein the one or more processors are further configured to:
determine whether the message beacon device is associated with a constant power supply or a depleting power supply;
increase the resource consumption indicator in response to a determination that the message beacon device is associated with the depleting power supply; and
decrease the resource consumption indicator in response to a determination that the message beacon device is associated with the constant power supply.

15. The message beacon device of claim 13, wherein the one or more processors are further configured to:
determine a power consumption rate associated with each identified transceiver;
increase the resource consumption indicator in response to a determination that the identified transceiver is associated with a high power consumption rate; and
decrease the resource consumption indicator in response to a determination that the identified transceiver is associated with a low power consumption rate.

16. The message beacon device of claim 13, wherein the one or more processors are further configured to:
determine a message beacon transmission interval associated with each identified transceiver;
increase the resource consumption indicator in response to a determination that the identified transceiver is associated with a high message beacon transmission interval; and
decrease the resource consumption indicator in response to a determination that the identified transceiver is associated with a low message beacon transmission interval.

17. The message beacon device of claim 12, wherein the one or more processors are further configured to:
determine an interference indicator associated with operation of each identified transceiver; and
for each analyzed transceiver:
include the analyzed transceiver in the transmission set in response to a determination that the interference indicator is less than a first interference threshold; and
exclude the analyzed transceiver from the transmission set in response to a determination that the resource consumption indicator is greater than a second interference threshold.

18. The message beacon device of claim 17, wherein the one or more processors are further configured to:
estimate an interference value reflecting interference caused at the different transceiver by message beacon transmission from each identified transceiver;
increase the interference indicator in response to a determination that the identified transceiver is associated with a high level of interference; and
decrease the interference indicator in response to a determination that the identified transceiver is associated with a low level of interference.

19. The message beacon device of claim 18, wherein the one or more processors are further configured to:
measure the interference value caused by message beacon transmission; or
determine the interference value from a lookup table based on a radio access technology associated with the identified transceiver, a message beacon transmission interval associated with the identified transceiver, a transmission power associated with the identified transceiver, or a combination thereof.

20. The message beacon device of claim 12, wherein the one or more processors are further configured to:
the processor is further configured to determine a reach indicator associated with operation of each identified transceiver; and
for each analyzed transceiver:
include the analyzed transceiver in the transmission set in response to a determination that the reach indicator is greater than a first reach threshold; and
exclude the analyzed transceiver from the transmission set in response to a determination that the resource consumption indicator is less than a second reach threshold.

21. The message beacon device of claim 20, wherein:
the plurality of transceivers are further configured to receive acknowledgements; and
the one or more processors are further configured to:
count the number of acknowledgements received by each identified transceiver;
increase the reach indicator in response to a determination that the identified transceiver is associated with a high number of received acknowledgements; and
decrease the reach indicator in response to a determination that the identified transceiver is associated with a low number of received acknowledgements.

22. The message beacon device of claim 20, wherein the one or more processors are further configured to:
identify a vendor, manufacturer, or message beacon protocol associated with each identified transceiver; and
set the reach indicator associated with each identified transceiver based on the identified vendor, manufacturer, or message beacon protocol.

23. An apparatus for optimizing the reach of a message beacon device, comprising:
means for identifying a plurality of transceivers associated with the message beacon device;
means for analyzing each identified transceiver on the basis of a resource consumption associated with the identified transceiver, an interference of the identified transceiver with a different transceiver of the plurality of identified transceivers, a reach of the identified transceiver, or a combination thereof;
means for selecting a transmission set for transmission of a message beacon from the plurality of identified transceivers based on the analysis of each identified transceiver, wherein selecting the transmission set comprises excluding at least one transceiver of the plurality of transceivers from the selected transmission set; and
means for transmitting the message beacon using each selected transceiver in the transmission set.

24. The apparatus of claim 23, wherein:
means for analyzing each identified transceiver comprises means for determining a resource consumption indicator associated with operation of each identified transceiver; and
means for selecting a transmission set comprises:
  means for including the analyzed transceiver in the selected transmission set in response to a determination that the resource consumption indicator is less than a first resource consumption threshold; and
  means for excluding the analyzed transceiver from the selected transmission set in response to a determination that the resource consumption indicator is greater than a second resource consumption threshold.

25. The apparatus of claim 23, wherein:
means for analyzing each identified transceiver comprises means for determining an interference indicator associated with operation of each identified transceiver; and
means for selecting a transmission set comprises:
  means for including the analyzed transceiver in the selected transmission set in response to a determination that the interference indicator is less than a first interference threshold; and
  means for excluding the analyzed transceiver from the selected transmission set in response to a determination that the resource consumption indicator is greater than a second interference threshold.

26. The apparatus of claim 23, wherein:
means for analyzing each identified transceiver comprises means for determining a reach indicator associated with operation of each identified transceiver; and
means for selecting a transmission set comprises:
  means for including the analyzed transceiver in the selected transmission set in response to a determination that the reach indicator is greater than a first reach threshold; and
  means for excluding the analyzed transceiver from the selected transmission set in response to a determination that the resource consumption indicator is less than a second reach threshold.

27. A non-transitory computer-readable medium comprising code, which, when executed by a processor, causes the processor to perform operations for optimizing the reach of a message beacon device, the non-transitory computer-readable medium comprising:
  code for identifying a plurality of transceivers associated with the message beacon device;
  code for analyzing each identified transceiver on the basis of a resource consumption associated with the identified transceiver, an interference of the identified transceiver with a different transceiver of the plurality of identified transceivers, a reach of the identified transceiver, or a combination thereof;
  code for transmission set for transmission of a message beacon from the plurality of identified transceivers based on the analysis of each identified transceiver, wherein selecting the transmission set comprises excluding at least one transceiver of the plurality of transceivers from the selected transmission set; and
  code for transmitting the message beacon using each selected transceiver in the transmission set.

28. The computer-readable medium of claim 27, wherein:
code for analyzing each identified transceiver comprises code for determining a resource consumption indicator associated with operation of each identified transceiver; and
code for selecting a transmission set comprises:
  code for including the analyzed transceiver in the selected transmission set in response to a determination that the resource consumption indicator is less than a first resource consumption threshold; and
  code for excluding the analyzed transceiver from the selected transmission set in response to a determination that the resource consumption indicator is greater than a second resource consumption threshold.

29. The non-transitory computer-readable medium of claim 27, wherein:
code for analyzing each identified transceiver comprises code for determining an interference indicator associated with operation of each identified transceiver; and
code for selecting a transmission set comprises:
  code for including the analyzed transceiver in the selected transmission set in response to a determination that the interference indicator is less than a first interference threshold; and
  code for excluding the analyzed transceiver from the selected transmission set in response to a determination that the resource consumption indicator is greater than a second interference threshold.

30. The non-transitory computer-readable medium of claim 27, wherein:
code for analyzing each identified transceiver comprises code for determining a reach indicator associated with operation of each identified transceiver; and
code for selecting a transmission set comprises:
  code for including the analyzed transceiver in the selected transmission set in response to a determination that the reach indicator is greater than a first reach threshold; and
  code for excluding the analyzed transceiver from the selected transmission set in response to a determination that the resource consumption indicator is less than a second reach threshold.

* * * * *